United States Patent
O'Neill et al.

(10) Patent No.: US 10,191,663 B1
(45) Date of Patent: Jan. 29, 2019

(54) USING DATA STORE ACCELERATOR INTERMEDIARY NODES AND WRITE CONTROL SETTINGS TO IDENTIFY WRITE PROPAGATION NODES

(71) Applicant: Amazon Technologies, Inc., Seattle, WA (US)

(72) Inventors: Brian O'Neill, Bellevue, WA (US); Kevin Christen, Seattle, WA (US); Omer Ahmed Zaki, Bellevue, WA (US); Kiran Kumar Muniswamy Reddy, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 15/269,935

(22) Filed: Sep. 19, 2016

(51) Int. Cl.
*G06F 3/06* (2006.01)
*G06F 17/30* (2006.01)
(Continued)

(52) U.S. Cl.
CPC .......... *G06F 3/0611* (2013.01); *G06F 3/0604* (2013.01); *G06F 3/065* (2013.01);
(Continued)

(58) Field of Classification Search
CPC ...... G06F 3/0611; G06F 3/0619; G06F 3/065; G06F 3/067; G06F 9/54; G06F 17/30575; G06F 17/30578; G06F 17/30581
See application file for complete search history.

(56) References Cited

U.S. PATENT DOCUMENTS

| | | | |
|---|---|---|---|
| 7,505,979 B2* | 3/2009 | Tamatsu | ............ G06F 17/30595 |
| 2012/0047126 A1* | 2/2012 | Branscome | ....... G06F 17/30519 |
| | | | 707/714 |

(Continued)

FOREIGN PATENT DOCUMENTS

| CN | 104346433 | 2/2015 |
|---|---|---|
| WO | 2004036432 | 4/2004 |

OTHER PUBLICATIONS

"Write Concern", MongoDB Manual 3.2, Retrieved from URL: https://docs.mongodb.com/manual/reference/write-concern on Aug. 21, 2016, pp. 1-6.

(Continued)

*Primary Examiner* — Glenn Gossage
(74) *Attorney, Agent, or Firm* — Robert C. Kowert; Meyertons, Hood, Kivlin, Kowert & Goetzel, P.C.

(57) ABSTRACT

An accelerator intermediary node (AIN) associated with a data store obtains an indication of a control setting to be applied with respect to a write request directed to a data item, where the control setting specifies a target for one or more of replication count, data durability, a transaction grouping with respect to a write request, or back-end synchronization node. Using the control setting, a write propagation node set is identified for the write request. The write propagation node set includes another accelerator intermediary node and/or a storage node of a data store. Respective operation requests corresponding to the write request are transmitted to one or more members of the write propagation node set. A write coordinator role may be verified prior to attempting a commit together of a plurality of write requests as part of a multi-write transaction.

20 Claims, 12 Drawing Sheets

(51) Int. Cl.
*G06F 9/54* (2006.01)
*G06F 9/455* (2018.01)

(52) U.S. Cl.
CPC ............ *G06F 3/067* (2013.01); *G06F 3/0619* (2013.01); *G06F 3/0655* (2013.01); *G06F 9/54* (2013.01); *G06F 17/30575* (2013.01); *G06F 17/30578* (2013.01); *G06F 2009/45562* (2013.01)

(56) References Cited

U.S. PATENT DOCUMENTS

| | | | | |
|---|---|---|---|---|
| 2013/0212340 | A1* | 8/2013 | Berg | G06F 3/0619 711/154 |
| 2014/0122489 | A1* | 5/2014 | Mesnier | H04L 67/1097 707/737 |
| 2014/0330921 | A1* | 11/2014 | Storm | H04L 67/1097 709/213 |
| 2015/0046428 | A1* | 2/2015 | Asaad | G06F 17/30463 707/718 |
| 2016/0065492 | A1* | 3/2016 | Hu | H04L 47/783 709/226 |

OTHER PUBLICATIONS

"Amazon ElastiCache API Reference", Amazon Web Services, API Version, Feb. 2, 2015, pp. 1-169.
"Amazon DynamoDB Developer Guide", Amazon Web Services, API Version, Aug. 10, 2012, pp. 1-715.
"Amazon ElastiCache User Guide", Amazon Web Services, API Version, Feb. 2, 2015, pp. 1-303.
"My SQL::MySQL 5.7 Reference Manual:16.3.3.2 Using memcached as a MySQL Caching Layer", Retrieved from URL: https://dev.mysql.com/doc/refman/5.7/en/hamemcachedmysqlfrontend.html on Feb. 22, 2016, pp. 1-3.
"Overview—memcached/memcached Wiki—GitHub", Retrieved from URL: https://github.com/memcached/memcached/wiki/Overview on Feb. 22, 2016, pp. 1-4.
Using Redis as an LRU cache—Redis, Retrieved from URL: http://redis.io/topics/lrucache on Feb. 22, 2016, pp. 1-6.
"What eviction policies do you support?", Retrieved from URL: https://support.redislabs.com/hc/enus/articles/203290657Whatevictionpoliciesdoyousupport1/ on Jan. 27, 2016, pp. 1-2.
"MongoDB Documentation Release 3.2.3", MongoDB, Inc., Feb. 17, 2016, pp. 1-1068.
C. Bormann, et al., "Concise Binary Object Representation (CBOR)", Internet Engineering Task Force (IETF), RFC7049, Oct. 2013, pp. 1-54.
"The tupl Open Source Project on Open Hub", Retrieved from URL, https://www.openhub.net/p/tupl on Feb. 9, 2016, pp. 1-5.
U.S. Appl. No. 15/085,967, filed Mar. 30, 2016, Kiran Kumar Muniswamy Reddy et al.
U.S. Appl. No. 15/085,956, filed Mar. 30, 2016, Kiran Kumar Muniswamy Reddy et al.
U.S. Appl. No. 15/085,957, filed Mar. 30, 2016, Kiran Kumar Muniswamy Reddy et al.

* cited by examiner

Table 402

| Mechanism for specifying control settings | Applicable data item granularity | Applicable time period |
|---|---|---|
| Explicit, via optional write-API parameters 412 | Arbitrary granularity 422 (e.g., operation's targeted record(s)/row(s), groups of operations) | Short duration 432 (typically corresponding to one API or a small number of APIs) |
| Explicit, via console interface, GUI, or settings-specific API 414 | Table/data-store granularity 424 | Longer duration 434 (e.g., until settings are modified) |
| Implicit, via high-level SLA 416 | Service translates goals into data-store granularity settings 426 | Longer duration 436 (e.g., until SLAs are modified) |

FIG. 4

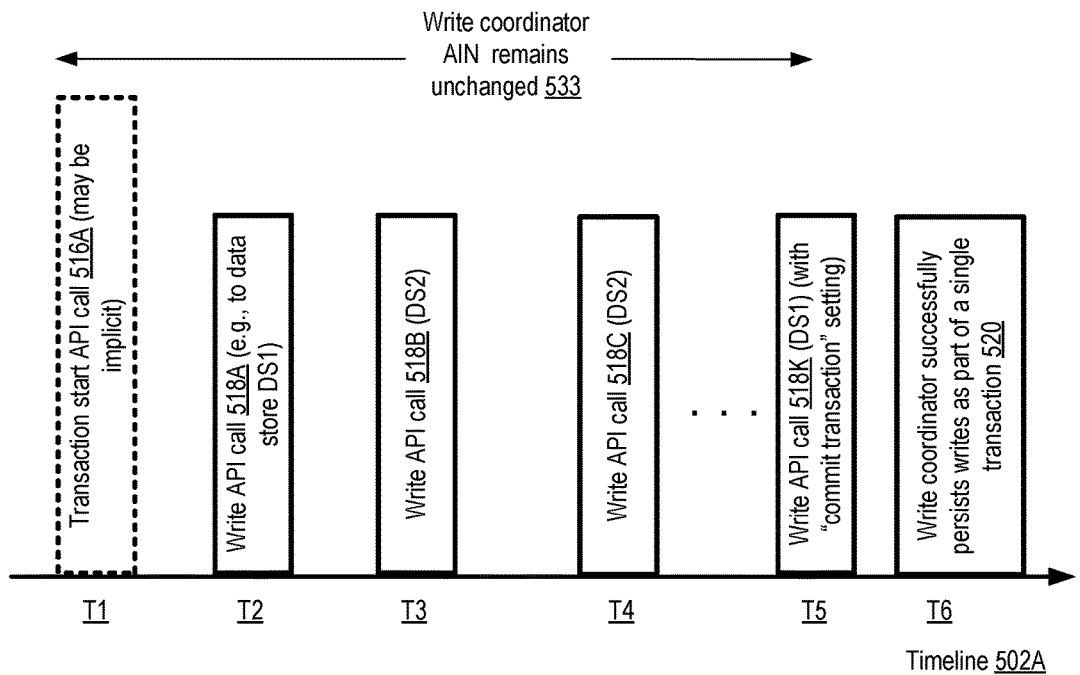
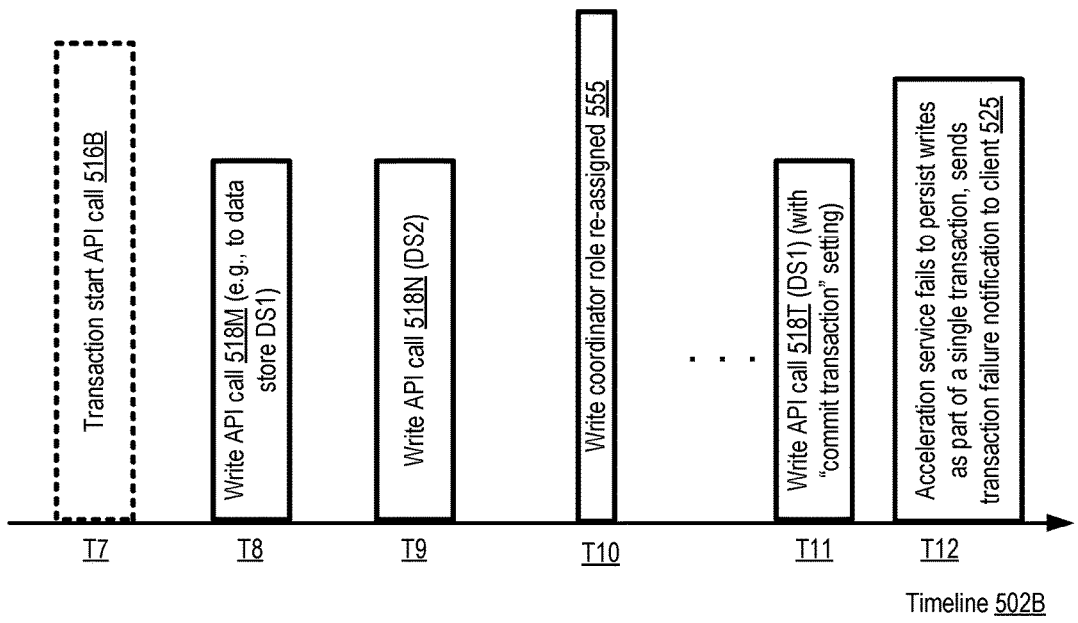
FIG. 5

USING DATA STORE ACCELERATOR INTERMEDIARY NODES AND WRITE CONTROL SETTINGS TO IDENTIFY WRITE PROPAGATION NODES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Similarly, a single physical storage device may be used to store data objects/items of several different customers, e.g., in respective virtualized storage containers.

Some service providers have built sophisticated multi-tenant database services (as well as other types of multi-tenant storage services) using virtualized storage nodes as building blocks. By distributing the data of a given customer across multiple storage nodes, storing the data of multiple customers on a given storage node, and distributing the storage nodes across multiple physical data centers, very high levels of data durability and availability may be supported at such multi-tenant services. While multi-tenancy (the sharing of physical resources among multiple customers) may help increase overall resource utilization levels from the perspective of a service provider, some storage application users may prefer to access at least a subset of their data in single-tenant mode. Furthermore, customers may wish to achieve different levels of service quality with respect to respective sets of I/O (input/output) requests from a given application—for example, for some writes, a higher number of replicas may be desired than for others, or a higher latency may be acceptable than for others.

BRIEF DESCRIPTION OF DRAWINGS

FIG. 4 illustrates example granularities and time periods associated with several alternative mechanisms for specifying control settings requests, according to at least some embodiments.

FIG. 5 illustrates example timelines of events associated with transaction grouping requests, according to at least some embodiments.

Figure 1:
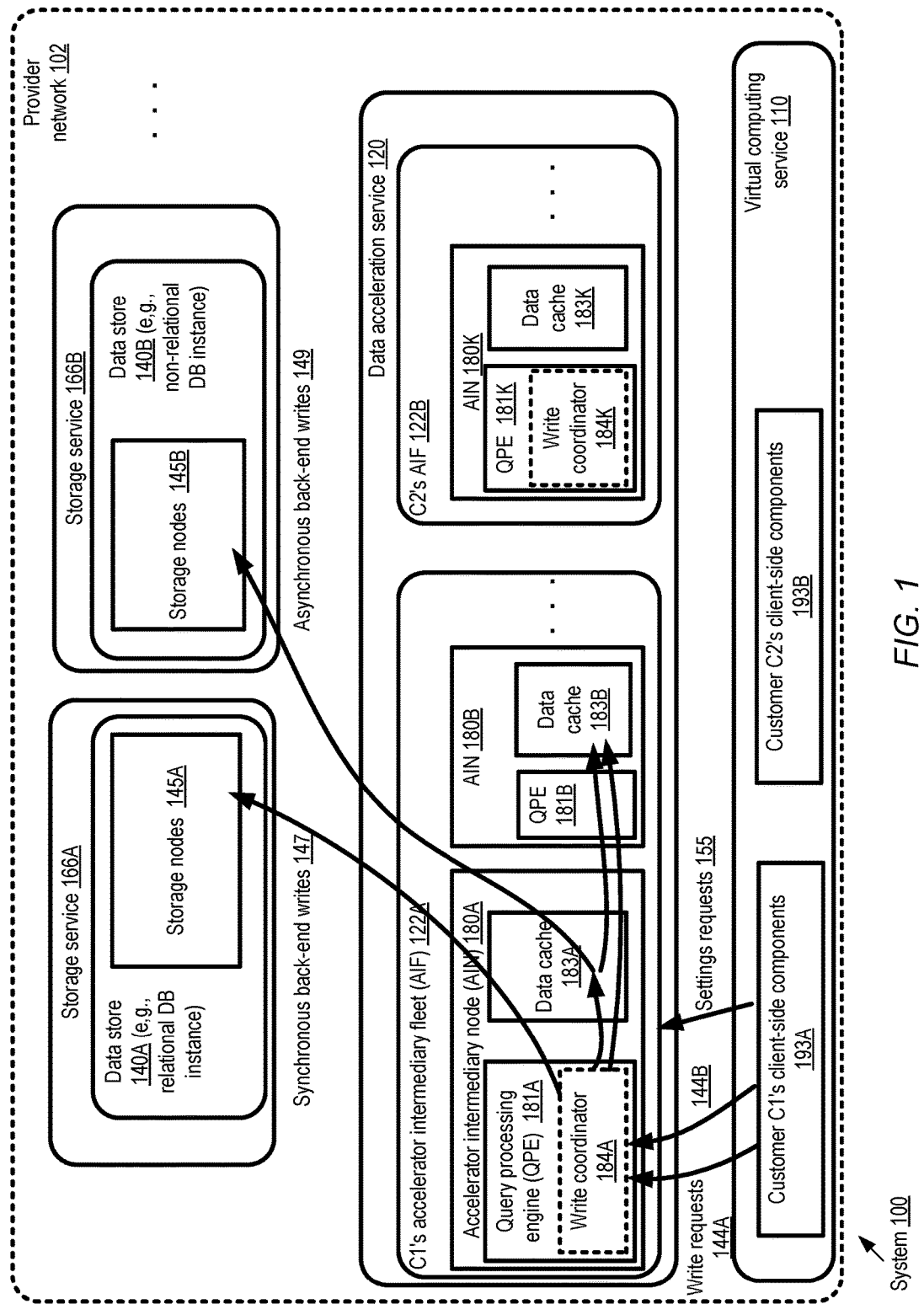
FIG. 1 illustrates an example system environment in which respective fleets of accelerator intermediary nodes, capable of satisfying variable-granularity control settings requests pertaining to I/O operations, may be established on behalf of respective clients of one or more data stores, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for operations performed at accelerator intermediary nodes associated with storage services at a provider network, such as the fulfillment of control settings requests at varying granularities (including on a per-write-call level), are described. A given control settings request may indicate one or more desired characteristics of an I/O operation (or a group of I/O operations) as described below, such as the number of replicas of a write, transaction grouping requirements, whether the payload of a write is to be synchronously transmitted to a node of the storage service or not, etc. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In some provider networks, a multi-tenant virtualized computing service as well as one or more multi-tenant storage services may be supported. Using such services, customers may, for example, acquire a set of virtual machines from the virtual computing service, store various data sets at storage devices of selected storage services, and use the virtual machines to run applications that access the data sets. A given resource (e.g., a storage device or a computing device) of a multi-tenant service may at least in principle be utilized for operations performed on behalf of multiple customer accounts. At least some of the services of a provider network may support single tenant mode of operation (in which a given resource is dedicated exclusively to a particular customer instead of being shared among multiple customers), e.g., in addition to or instead of a multi-tenant mode.

A variety of storage services may be implemented at a single provider network in some cases. In one embodiment, for example, the storage services may include a non-relational database service (also known as a NoSQL database service), a relational database service, and/or an object storage service in which unstructured objects of arbitrary size may be stored and accessed using web-service interfaces. Each of the storage services may comprise respective pools of storage, computing and networking resources, which may in some cases be managed separately from the resources of the virtualized computing service. For example, in one implementation a separate logical partition of the provider network may be used for a given storage service than is used for the virtualized computing service, or the computing devices used for a given storage service may be physically segregated (e.g., in different data center rooms or racks) from the computing devices used for the virtualized computing service. A storage service may provide high levels of availability and data durability, e.g., by partitioning data sets across multiple multi-tenant storage nodes (each of which in turn may comprise various physical storage devices), replicating partitions across data centers, and so on. A given storage service may be used to create multiple instances of data stores set up for respective applications and/or respective customers—e.g., instances of relational databases, instances of non-relational databases, or groups of storage objects may be created. The term "data store", as used herein, may refer to a collection of data items (e.g., database tables, indexes, binary objects, and the like) with an associated namespace (e.g., a database name or an object/item collection name) established on behalf of one or more customer accounts of one or more storage services. The terms "data item" and "data object" may be used synonymously herein. It is noted that at least some storage services of a provider network may not natively support multi-write transactions—that is, support for committing multiple writes as a single unit need not necessarily be provided by a storage service itself. In at least some embodiments, support for multi-write transactions (including in cases where different subsets of the writes of a given transaction are directed to different back-end data stores, potentially with differing data models) may be implemented with the help of intermediary nodes of a data acceleration service as described below.

According to one embodiment, a provider network may comprise a data acceleration service which may be used as an intermediary between one or more storage services and computing devices hosting components of applications that utilize data sets stored at the one or more storage services. The data acceleration service may also be referred to herein as a query acceleration service or simply as an acceleration service. Using such an acceleration service, for example, a single-tenant fleet of accelerator intermediary nodes may be established on behalf of a given customer of a storage service to help speed up I/O operations of one or more storage applications of the customer. A number of different categories of control settings requests, individual ones of which are to be applied with respect to a respective set of one or more I/O operations, may be submitted to the data acceleration service by clients. Generally speaking, one or more nodes of the data acceleration service and/or the storage service(s) may be involved in fulfilling or satisfying a given control settings request in various embodiments. As discussed below in further detail, control settings requests at a number of different granularities, submitted via a variety of interfaces may be handled (at least in part) by the data acceleration service layer in some embodiments. In one embodiment, the dimensions for which respective targets may be indicated by a client via a control settings request associated with one or more writes may include, among others, a replication count, a data durability level, a synchronization mode with respect to a back-end data store, transaction grouping (e.g., whether the modifications indicated in some set of writes should be committed to back-end data store(s) as an atomic unit), acceptable storage device types to be used for the write(s), and so on. Control settings requests pertaining to write operations will be the primary focus of much of the remainder of this description. However, it is noted that at least in some embodiments, analogous requests associated with read operations may also be supported—e.g., control settings requests indicating whether uncommitted reads are acceptable, or the consistency level of a given set of reads, may be supported in such embodiments.

In various embodiments, an accelerator intermediary node (AIN) of the acceleration service may comprise a local cache (implemented, for example using some combination of volatile and/or non-volatile memory) at which at least a subset of an application's data set may be stored at a given point in time, as well as a query processing engine configured to respond to I/O requests received from client-side components of storage applications. In some embodiments an AIN may comprise an API handler component (responsible for parsing and interpreting parameters of APIs invoked by client-side components, including APIs used for indicating control settings requests). In addition, in at least some embodiments an AIN may comprise a resource validator which may check whether the currently allocated set of resources are sufficient to fulfill or satisfy a control settings request. A client-side component may, for example, comprise one or more processes running at a virtual machine instantiated on behalf of a particular customer of the provider network, and may issue I/O requests formatted according to application programming interfaces of a storage service of the provider network. In some embodiments, the APIs of a storage service may be extended to allow control settings requests to be specified in the form of optional parameters. In such embodiments, while applications written to the core (un-extended) APIs of the storage service may continue to work without modification, those customers who wish to utilize control settings requests at a fine-grained level may modify their application code to use the optional parameters. Customers who do not wish to add optional parameters to their low-level API calls may submit control settings requests (typically applicable at a coarser granularity than individual write or read requests) via a console or other programmatic interfaces in at least some embodiments.

A given fleet of accelerator intermediary nodes may be termed "single-tenant" in that the nodes may be allocated for use by client-side components associated with a single customer account or client account in various embodiments. For example, the control plane (administrative component) of the data acceleration service may store metadata indicating that only those client-side components which are associated with the customer account may be permitted to access the accelerator intermediary nodes of the fleet, and an authorization management component of an accelerator intermediary node may reject requests or communications which do not originate at such client-side components. In at least one embodiment, one or more accelerator intermediary nodes may be configured in multi-tenant mode—e.g., a customer on whose behalf the node is initially established may request that client-side components associated with other customer accounts be permitted to use the node. In one embodiment, a storage service for which an accelerator intermediary fleet is configured may support single-tenancy—e.g., at least some storage nodes and/or other components of the storage service may be designated for exclusive use by a single customer.

According to at least one embodiment, a fleet of AINs may be set up on behalf of a customer whose data is distributed among a plurality of data stores (which may be implemented using one or more storage services). A particular AIN of the fleet may obtain, via a first programmatic interface, an indication of a first control setting to be applied with respect to a first write request directed to a particular data item. The first control setting may indicate a respective target for one or more of: (a) replication count, (b) data durability, (c) transaction grouping with respect to one or more write requests including the first write request, or (d) a data store synchronization mode. The indication of the control setting may be provided as a parameter of the write request itself in some cases, or may be provided in a separate control settings request. In various embodiments, a control setting may indicate a desired property of one or more writes, or a quality-related goal associated with one or more writes, such that an attempt to achieve the desired property or goal can be initiated (assuming that sufficient resources are available and any logical prerequisite conditions are met) by one or more components of the data acceleration service. It is noted that the terms "quality setting", "service quality setting" or simply "setting" may be used in place of the term "control setting" herein. Requests indicating control settings to be applied, which may be submitted programmatically, may also be referred to as "service quality requests" (e.g., in addition to being referred to as control settings requests). It is noted that a given control settings request may sometimes indicate a target setting for a single property of a write, despite the use of the plural term "settings".

The AIN may determine, based at least in part on the first control setting, a first write propagation node set with respect to the first write request. The first write propagation node set may comprise zero or more other accelerator intermediary nodes or storage nodes being used at a back-end storage service for one or more of the data stores, at which respective operations to meet the target(s) indicated of the control settings may have to be performed. Of course, some operations required to satisfy the control setting (such as storing a local copy of a write payload using an appropriate data encoding in a local data cache) may have to be performed at the same AIN at which the contents of the control setting are determined in at least some embodiments. The AIN may transmit, prior to providing an indication that the first write request has been fulfilled or satisfied, a respective operation request corresponding to the first write request to one or more members of the first write propagation node set.

An indication of a second control setting to be applied with respect to a second write request directed to a second data item may be received at the AIN. At least one target indicated in the second control setting may differ from a corresponding target indicated in the first control setting. Based on an analysis of the second control setting, the AIN may transmit operation requests corresponding to the second write request to one or more members of a second write propagation node set. In at least some cases, the second write propagation node set may comprise a storage node of a different data store than was used for the operations corresponding to the first write request. The different data stores may implement different data models in some cases—e.g., the first data store may comprise an instance of a relational database, while the second data store may comprise an instance of a non-relational database.

In order to determine the write propagation node sets for the various write operations affected by the control settings, the AIN may implement an algorithm similar to the following in at least some embodiments. The request for the control setting may first be parsed, e.g., to identify the specific write or set of writes to which it applies and the desired characteristics of the writes (e.g., number of replicas, data durability levels desired, transaction boundaries, etc.). Data durability levels may be indicated in some embodiments in terms of the number of acknowledgements that have to be received with respect to a given write's success from respective storage or memory devices. In some cases, a timeout period within which the acknowledgements have to be received may also be indicated in the control settings. Depending on the specific characteristics identified and/or the total number of writes affected, a determination may be made as to whether the set of resources of the acceleration service (and/or the storage service(s)) which are currently allocated to the customer on whose behalf the control setting is to be applied are sufficient to satisfy/fulfill the request or not. If, for example, the control setting indicates that ten different replicas are to be created of a given data object at respective AINs, and the fleet of AINs configured for the client only contains eight AINs, it may not be feasible to implement the requested replication level with the currently-allocated resources. In some embodiments, the request may then be rejected based on lack of sufficient resources, and the client may be informed accordingly. In other embodiments, the acceleration service may attempt to acquire the necessary resources. In at least one embodiment, the acceleration service may provide an indication of the resource change required to the client and request approval for acquiring necessary resources from the client. Assuming that the availability of sufficient resources has been verified, the AIN may also attempt to verify that any other logical prerequisites for the control setting are met—e.g., as discussed below in further detail, it may be the case that for some transaction grouping-related control settings requests, changes to the assignment of a write coordinator may have to be considered to determine whether the request can be satisfied. If the logical prerequisites are also met, the particular members of the write propagation node set may be identified (e.g., N–1 other AINs for N-way replication at the accelerator layer, since one replica may already be stored at the AIN which handles the control settings request, or K back-end storage nodes if a requested transaction grouping involves writing data to K different objects at respective storage nodes). With respect to individual members of the write propagation node set, the particular set of bits or bytes that is to be written (and the format of the bits or bytes) may be determined, and requests to perform corresponding writes may be transmitted to the members. In various embodiments, for example, as discussed below in further detail, the contents of a data object may be stored in different formats or encodings at the AIN caches and at the data stores—e.g., a binary encoding may be used at the caches, while a text encoding may be used at some storage nodes used for the data stores. It is noted that at least for some types of I/O operations, a client-side component may transmit a request directly to a storage service node, e.g., bypassing the intermediary acceleration service. In such cases, the operations required to fulfill a control settings request may be coordinated by (and/or performed by) one or more storage service nodes, e.g., without the participation of one or more AINs.

In some embodiments in which the storage service(s) used for the data stores and the virtualized computing service are implemented in separate logical partitions of the provider network, at least some of the accelerator intermediary nodes may be implemented within the logical partition of the provider network which is also being used for the virtualized computing service. As a result, the accelerator intermediary fleet may be located "nearer" to the client-side components, at least from a networking perspective—for example, on average fewer network links may have to be traversed for communications between client-side components and the accelerator intermediary nodes than have to be traversed for communications between the client-side components and the storage nodes of the storage service. In some cases, a placement manager component of the data acceleration service may select the physical locations (e.g., racks, rooms, or data centers) at which accelerator intermediary nodes are established on behalf of a customer based on proximity with respect to the virtual machines established for the customer. For example, the accelerator intermediary nodes may be physically located relatively near the hosts at which the customer's virtual machines run. In various embodiments, as suggested by the use of the term "accelerator", client requests which can be fulfilled by either the accelerator intermediary fleet alone or the storage service alone may typically be fulfilled more rapidly by the accelerator intermediary fleet than by the storage service. This performance difference may typically hold regardless of whether separate logical partitions of the provider network are used for the storage service than for the virtual computing devices, and regardless of the specific placement of various devices involved in I/O request handling. In some embodiments, at least some client-side components may run at devices outside the provider network (e.g., in a customer data center or customer office premises), and requests issued from such external components may also benefit from the enhanced performance enabled by an accelerator intermediary fleet.

In addition to the performance gains made possible by the proximity of the accelerator fleet to the client-side components, additional performance benefits may be achieved in at least some embodiments by storing data items using binary encodings at the accelerator intermediary nodes and implementing a number of shortcuts or optimizations for various types of operations using such binary encodings. In one embodiment, a storage service for which a data accelerator fleet is configured may store data items (e.g., records of non-relational or relational database tables) in text format or some other non-binary format, different from the format used at the accelerator intermediary layer. In some implementations, a version of JSON (JavaScript Object Notation) may be used as the text encoding format at some or all data stores of the storage service, for example, while a version of CBOR (Concise Binary Object Representation) similar to that defined in RFC (Request For Comments) 7049 of the Internet Engineering Task Force (IETF) may be used as the binary format at the accelerator intermediaries.

Enhanced client-side components of the storage service may transform data items into the binary encoding format before submitting them to the accelerator intermediary layers in some embodiments. The data items may be cached at the accelerator layer with minimal or no transformations and little or no type checking or other verifications. As a result, the amount of processing cycles required for a read or write may be reduced, relative to scenarios in which data items are processed in text format and/or scenarios in which an entire object graph of the data item is generated for the read or write.

When a query is received from a client-side component at an accelerator intermediary node, in at least some embodiments executable code may be generated for obtaining the results of the query from the locally-cached binary encodings of data objects (if such code is not already present at the accelerator intermediary node as a result of a similar previous query). The executable code may be stored in a query code cache so that it may, for example, be re-used for subsequent queries with matching or similar sets of query predicates and similar types of targeted data items. In one embodiment, a given executable code module for a query may be associated (e.g., via an index) with the combination of (a) a normalized or canonical representation of the query and (b) one or more top-level attribute list metadata entries indicating the data items to which the code is applicable.

The cached data items may be transformed (e.g., either at the accelerator intermediary nodes or at the storage service itself) into the appropriate format for storage at the back-end storage service. When a data item is retrieved from the back-end storage service into a cache at an accelerator intermediary node, its binary encoding may be generated for use at the accelerator node. Generally speaking, in at least some embodiments encoding and decoding transformations may be performed when data items are transmitted between the back-end storage service and the accelerator intermediary layer, and also when data items are transmitted between the accelerator intermediary layer and the client-side components. A number of different types of operations, such as projection-type queries, data item comparisons, multi-attribute queries and the like may be performed significantly more efficiently using the binary encodings than if non-binary encodings were used, as discussed below in further detail. The advantages gained by using the binary encoding format at the accelerator nodes may outweigh the overheads associated with the encoding and decoding for at least some types of workloads.

In various embodiments, for at least some data sets, the storage service(s) may serve as the authoritative source of the data, while the accelerator intermediary fleet nodes may be considered temporary containers of (in some cases potentially stale) versions of the data. The data stores containing the authoritative versions of the data may be termed back-end data stores, while the accelerator intermediary nodes may be termed part of a middleware layer of the overall system used for storage applications.

Each accelerator intermediary node of a given fleet may be assigned one of two roles in some embodiments. One or more nodes may be designated as "master" or "write coordinator" nodes at a given point in time, while the remainder of the nodes may be designated as "non-master" nodes. Writes may be directed to master nodes from client-side components, while reads may be directed to either master or non-master nodes in such embodiments. According to one embodiment, a master node may be responsible for propagating replicas of data items to non-master nodes (e.g., either a subset of non-master nodes, or all non-master nodes), depending on the particular replication count settings in use, and for coordinating back-end writes. The role of master or write coordinator may be dynamically reassigned in various embodiments, e.g., in the event of a failure at a current assignee of the write coordinator role, a new assignee may be selected using any of various protocols such as quorum-based protocols. One or more threads of execution may be established to implement the role of the write coordinator at an AIN in various embodiments.

In various embodiments, regardless of whether master or non-master roles are assigned, the nodes of a given accelerator intermediary fleet may differ from one another in various capabilities and characteristics. For example, the local caches of different nodes may differ in total size, or in the types of devices used for the local caches. Some nodes may use volatile memory (e.g., the "main" memory of a computing device) alone for their local caches. Other nodes may use a combination of volatile and non-volatile storage—e.g., main memory plus a solid state drive (SSD), main memory plus a magnetic rotating disk-based device, or main memory plus an SSD plus a rotating disk device. In one implementation, some nodes may utilize only non-volatile storage for their caches. In one embodiment, at least one accelerator intermediary node may utilize a network-attached storage drive for a portion of its local cache, e.g., if the latency for accessing the network-attached storage is smaller than the latency for accessing the back-end data store.

In some embodiments, as mentioned above, a given accelerator intermediary fleet may be configured for a group of data stores rather than a single data store. For example, an application may access data from an instance of a non-relational database and from an instance of a relational database, and a single fleet of accelerator intermediary nodes may be set up for the application. The accelerator intermediary nodes of the fleet may be able to direct requests to respective back-end data stores using different query languages—e.g., a version of SQL (Structured Query Language) may be used to access the relational database, while a different query language may be used to access the non-relational database. A single query from a client-side component may sometimes be translated into several distinct back-end queries from an accelerator node in such embodiments. A single transaction (whose boundaries are defined based on control settings requests) may comprise writes to multiple data stores in some cases, such as to a relational database instance and to a non-relational database instance (or to multiple independent instances of a particular type of database). A given transaction may also comprise multiple writes to a given data store which does not support multi-write transactions natively in some embodiments. In various embodiments, the use of variable-granularity control settings implemented with the help of an intermediary accelerator fleet may enable rich customization of I/O operations for a variety of applications of storage service customers.

Example System Environment

FIG. 1 illustrates an example system environment in which respective fleets of accelerator intermediary nodes, capable of satisfying variable-granularity control settings requests pertaining to I/O operations, may be established on behalf of respective clients of one or more data stores, according to at least some embodiments. As shown, system 100 comprises respective sets of resources of several different services implemented at a provider network 102—a data acceleration service 120, a virtualized computing service 110, and two storage services 166A and 166B. The virtualized computing service 110 may comprise a plurality of guest virtual machines (GVMs) set up on behalf of various customers, such as customers C1 and C2. A given customer may store a respective data set of an application at some number of storage nodes (SNs) 145 (e.g., 145A and 145B) of the storage services 166, while client-side components of the applications (e.g., 193A and 193B) may issue I/O requests directed to the data sets from guest virtual machines of the virtual computing service 110 in the depicted embodiment. Note that reference numerals accompanied by letters, such as 166A and 166B, may also be referred to herein using only the reference numeral (e.g., 166). For example, "storage service 166" may refer to storage service 166A, storage service 166B, or another storage service. "Storage services 166" may refer to two or more storage services (e.g., two or more of: storage service 166A, storage service 166B, and one or more other storage services).

Customers such as C1, C2 etc. of the storage services 166 may in general access their data sets either directly from the storage services, or with the help of an accelerator intermediary fleet (AIF) 122. As shown, respective AIFs 122A and 122B may have been established for customers C1 and C2. Each AIF 122 may comprise one or more accelerator intermediary nodes (AINs) 180 working collaboratively, with all the AINs of a given AIF being dedicated to a single customer's client nodes in the depicted embodiment. AIF 122A comprises AINs 180A and 180B set up on behalf of customer C1, while AIF 122B comprises AIN 180K. Each AIN 180 in turn may comprise at least a local data cache 183 and a query processing engine (QPE) 181. For example, AIN 180A comprises data cache 183A and QPE 181A, AIN 180B comprises data cache 183B and QPE 181B, and so on. In some embodiments, an AIN may also include a query code cache used for storing executable code (which may have been generated locally at a code generator of the AIN) corresponding to client queries which may at least in principle be re-used. It is noted that at least some of the AINs of a given AIF may differ from one another in one or more characteristics—e.g., they may have different performance capabilities, use different types of storage devices for their caches, the sizes of the local caches of either type may vary, and so on. In one embodiment, some AINs may not necessarily include local query code generators and/or local query code caches. An accelerator intermediary fleet may be established either at the time that a customer creates a data set at a storage service 166, or at some later time in the depicted embodiment, and the number of AINs may be increased or decreased dynamically as desired. In different embodiments, a given storage service 166 or a data store 140 (e.g., 140A or 140B) may be implemented in either multi-tenant mode (in which a given storage node 145 may be shared among multiple customers) or in single-tenant mode (dedicated to a single customer). Some storage services and/or data stores may support both single-tenant and multi-tenant modes of operation.

In the depicted embodiment, data items may be stored in a different format at the storage services 166 than the format used to store entries for the items in the local data caches at the AINs 180. For example, the storage service 166A may use text encodings or text representations (such as JSON), while a binary encoding such as CBOR or the like (e.g., MessagePack, Binary Javascript Object Notation (BSON), or Universal Binary Javascript Object Notation (UBJSON)) may be used at the AINs. When a data item is obtained at an AIN, e.g., by retrieving a text-encoded version of the item from the storage service in response to a read request from a client-side component, a corresponding binary encoding may be generated at the AIN, with the binary-encoded version rather than the text-encoded version being placed in the data cache.

Write requests 144 (e.g., 144A or 144B) may be submitted by client-side components 193 to selected AINs (e.g., in the case of client-side component 193A, to an AIN 180A comprising a write coordinator 184A for customer C1's AIF 122A). When a write request 144 is received at an AIN such as 180A, the control settings applicable to that request may be determined by the write coordinator. As discussed below, a number of different mechanisms for indicating control settings and thereby achieving desired service qualities may be used in different embodiments; for example, individual write API calls may include control settings requests. Based on the applicable settings, one or more copies of the write's payload (the bytes modified) may be stored at the AIF (e.g., at data caches 183A and 183B), and a write completion indication may be provided to the client-side component after the caching is complete. Later, the write payload may be suitably formatted and transmitted to the back-end data stores asynchronously (as indicated by arrow 149). Such asynchronous propagation of writes to the back-end data store layer may be referred to as a "write-back" mode of operation. In contrast, depending for example on the control settings applicable, some writes may be synchronously transmitted to the back-end layer, as indicated by arrow 147. This mode of operation, in which a write completion response to the client-side component is not provided until the write has been successfully propagated to the back-end layer, may be referred to as "write-through" mode.

In at least some embodiments, in addition to write requests such as 144A and 144B, clients may also submit various types of control settings requests 155 to the data acceleration service. In some embodiments, the control settings requests, each of which may indicate or specify one or more targets for write replication counts, data durability (which may correspond to the number of distinct acknowledgements that the contents of the write have been stored at respective devices), transaction grouping, acceptable storage devices types, synchronization mode with respect to the storage services, and the like, may be indicated via optional parameters of write request APIs. In other embodiments, control settings requests may be specified using other types of programmatic interfaces, such as a web-based management console or a graphical user interface. Upon determining a control setting which is to be applied or enforced with respect to a set of one or more writes 144, a particular AIN 180 which is designated as a write coordinator with respect to at least one write of the set of writes may identify zero or more other nodes (e.g., including other AINs, or storage nodes 145) to which contents of the writes are to be propagated. Such nodes may collectively be referred to as a write propagation node set. Respective operation requests may be transmitted to the members of the identified write propagation node set (in those cases when the write propagation node set is not empty) in the depicted embodiment. In some cases, a single control settings request may result in writes being propagated to several different storage nodes 145 of one or more data stores 140. Additional details regarding the manner in which the control settings requests may be received and processed in different embodiments are provided below.

Example API Calls

Figure 2:
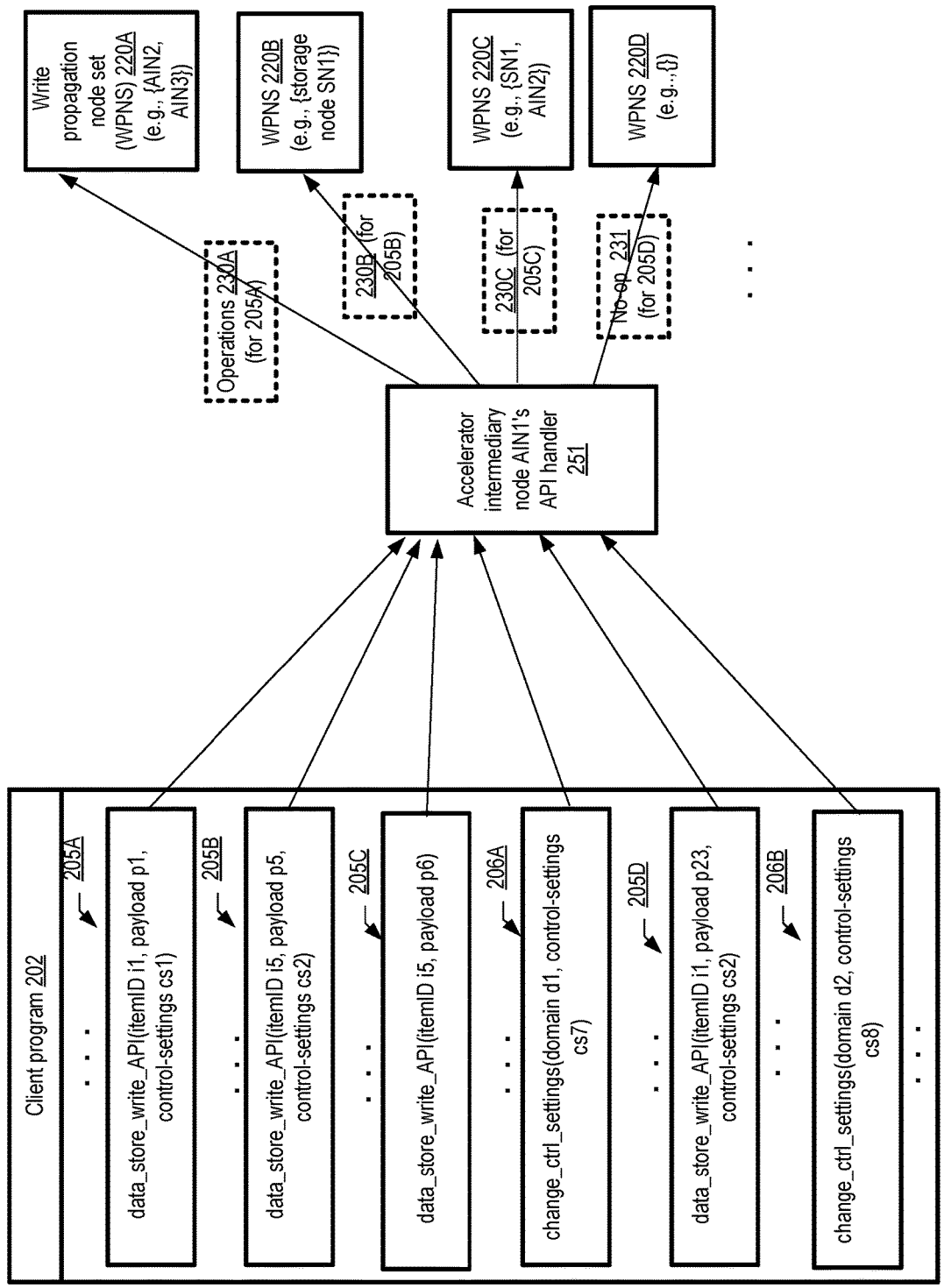
FIG. 2 illustrates examples of application programming interface (API) calls which may be used to indicate control settings requests, according to at least some embodiments.

FIG. 2 illustrates examples of application programming interface (API) calls which may be used to indicate control settings requests, according to at least some embodiments. Client program 202 may comprise a number of write requests 205 (each corresponding to an invocation of a "data_store_write_API" function or method), such as write requests 205A-205D directed to various data objects being managed with the help of an acceleration service in the depicted embodiment. In addition, client program 202 may also comprise one or more API calls specific to write control settings, such as "change_ctrl_settings" calls 206A and 206B. Of course, in various embodiments, a client program 202 may also comprise read API calls as well as other logic not shown in FIG. 2.

In the depicted embodiment, a given write request or write API call 205 may optionally include one or more parameters indicating various details of a write control settings request, in addition to parameters specifying the identifiers of target object(s) of the write, the payload of the write, etc. The optional parameters used for control settings requests may represent an extension of the baseline or default write APIs supported by the data stores or the storage service to which the writes are directed. For example, the parameter "service-quality-settings" may be added as an option to the baseline API "data_store_write_API". Some write requests, such as 205A, 205B and 205D, may include respective control-settings parameters such as "cs1" or "cs2", while other invocations of the storage service's API (such as 205C) may not. Values for the targeted object(s) (indicated via parameter "itemID") and write payload (the actual modifications or write contents, indicated via parameter "payload") may be passed during each of the data_store_write_API invocations, regardless of whether a service-quality-settings parameter is passed. In scenarios in which client program 202 issues writes to more than one data store, the respective (potentially different) write APIs for each of the targeted data stores may be used.

The scope of the control settings indicated via the optional parameters of the write APIs may encompass one or more writes in various embodiments. For example, in some embodiments, the settings for replication count or data durability may apply to only the particular write request within which the settings were requested using the optional parameter. In other embodiments, a given control settings request may be applied to some collection of previous writes as well as the current write (as in the case of transaction grouping requests discussed below), to some number of subsequent writes in addition to the current write, or to some number of subsequent writes excluding the current write.

In the depicted embodiment, some control settings changes may be made without using write APIs per se—e.g., the native API of the data store may be extended by adding service-quality specific APIs such as "change-ctrl-settings". Such APIs may, for example enable clients to specify the domains (e.g., using the "domain" parameter as shown for calls 206A and 206B) over which the requested settings are to apply, as well as the settings themselves (using the "service-quality-settings" parameter). The domains may be specified with respect to any of several dimensions, such as the set of data items or write requests to which the settings apply, the time period to which the settings apply, etc. Such APIs may be used, for example, to change control settings for some number of subsequent writes (e.g., until another settings change is indicated), or for groups of data objects such as a set of one or more tables (which may be indicated via the domain parameter), one or more database instances, etc. In some embodiments, domains for control settings may be specified in terms of time periods—e.g., the logical equivalent of "use settings cs7 for all writes, unless the settings are overridden in the write requests, for the next 4 hours" may be requested via a change-ctrl-settings call.

An API handler 251 of an accelerator intermediary node (AIN) may receive an indication of a write control settings request, either as part of a write API or as a separate API. Corresponding to individual ones of the write API calls, the AIN may identify the applicable control settings (if any), analyze the contents of the applicable write control settings, and determine the members of a write propagation node set (WPNS) to be used to implement the requested control setting. Depending on the specific control settings requested, a write propagation node set may comprise, for example, zero or more other AINs and zero or more storage nodes of the back-end data stores. If the WPNS is non-null, respective operations may be initiated by the AIN at members of the WPNS. For example, with respect to write request 205A, operations 230A may be initiated at member nodes AIN2 and AIN3 of WPNS 220A. With respect to write request 205B, an operation 230B may be initiated at a back-end storage node SN1, and with respect to write request 205C, operations 230C may be initiated at AIN2 and at storage node SN1. In the case of write request 205D (which may be satisfied by the receiving AIN itself, and hence may not have any members in its WPNS), no operation may be required at other nodes, as indicated by "No-op" 231. Even though write request 205C does not include a control settings request as a parameter, it may still be the case that a different control setting (or the default control setting in use for the data-store-write-API calls) may be applicable in the depicted embodiment.

Categories of Control Settings

Figure 3:
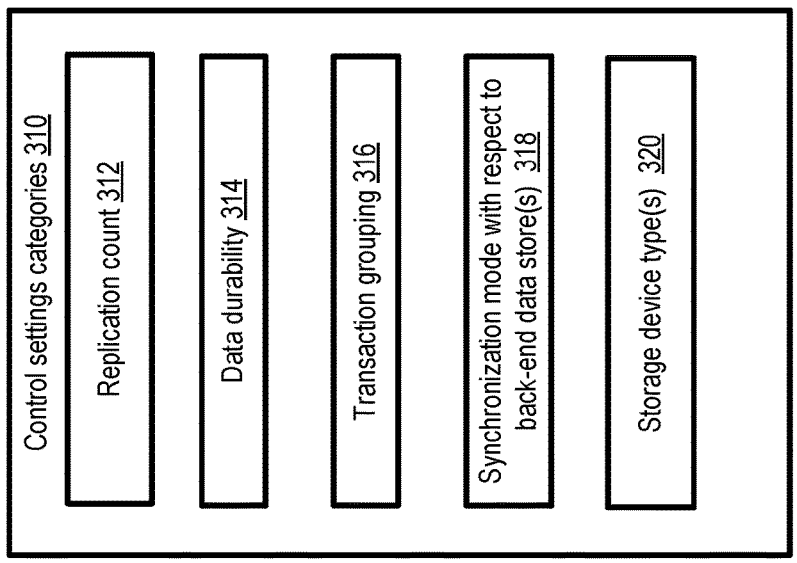
FIG. 3 illustrates example categories of control settings which may be indicated by data store clients, according to at least some embodiments.

FIG. 3 illustrates example categories of control settings which may be indicated by data store clients, according to at least some embodiments. As shown, categories 310 may include, among others, replication count 312, data durability 314, transaction grouping 316, synchronization mode with respect to back-end data store(s) 318 and storage device type(s) 320.

The replication count setting 312 may indicate, for each of a given set of one or more writes to which the settings apply, the number of distinct replicas (typically at respective storage devices) which are to be created. For example, syntax similar to "replicas=4", "replica-count=2" or the like may be used. With respect to data durability 314, the settings may indicate whether acknowledgements of writes to stable (e.g., non-volatile) storage are required before a write is considered complete, and if so, how many replicas need to be written to stable storage (and acknowledged). Example settings for data durability may include, for example, "master-ack-only" (indicating only one acknowledgement of persisting a write, from a master or write coordinator AIN is required), "master-plus-two-acks" (indicating that acknowledgements from a master and two-non-masters is required) and so on. In some cases, the acknowledgement types requested may differ for respective replicas—e.g., an explicit immediate acknowledgement may be requested in a control settings request with respect to each of two replicas, with a delayed acknowledgement acceptable for a third replica, and no acknowledgements required for a fourth or fifth replica.

With respect to transaction grouping 316, a client program may indicate, for example, that an attempt to commit, as a unit, (a) all writes since a previous transaction start request was issued or (b) all the writes that it is possible to commit as a group, but have not yet been committed, should be made. The notation "commit-since-start-trans" or "commit-all" may be used for these two types of settings for transaction grouping. With respect to synchronization mode 318, "write-back" or "write-through" modes may be supported in various embodiments. In the case of write-through, a write may have to be made persistent at one or more back-end storage nodes before an indication that the write has completed successfully is provided to the requesting client program. In the case of write-back, writes may be cached at the accelerator fleet, and written to the back end storage nodes asynchronously as discussed below in further detail.

In some embodiments, a client may expressly indicate the kinds of storage devices at which at least one replica (or the original write payload) is to be stored—e.g., the notations "device-type=SSD" and "device-type=mag-disk" may be used to indicate that solid state drives (SSDs) or magnetic rotating disks are to be used in some embodiments. It is noted that it may be possible to provide mutually incompatible or inconsistent settings for the different categories in some embodiments—e.g., a replica count of one may be specified, together with a data durability setting of "master-plus-two-acks" for a given set of writes. In such scenarios, the accelerator fleet may be responsible for resolving inconsistencies. This may be done, for example, either by informing the requester that the settings are inconsistent and rejecting the incompatible settings request(s), or by determining the actual combination of settings to be applied from the inconsistent requests using heuristics. In one scenario, for example, a resource-conserving heuristic may be used, in which an attempt to use the smallest set of resources which is compatible with at least one setting of an inconsistent set of settings may be made. In another example scenario, a prioritize-data-durability heuristic may be used, in which an attempt to provide the highest data durability indicated among the inconsistent requests maybe made—e.g., the replica count may be increased to meet the durability setting request if needed.

Granularities of Control Settings Requests

FIG. 4 illustrates example granularities and time periods associated with several alternative mechanisms for specifying control settings requests, according to at least some embodiments. As shown in table 402's first column, entitled "mechanism for specifying control settings", at least three mechanisms may be supported in the depicted embodiment: explicit specification via optional parameters of write-API calls 412, explicit specification via a console interface, GUI or settings-specific API 414, and implicit specification via a high-level service level agreement (SLA) 416. Examples of the write-API-based mechanism as well as the settings-specific APIs were discussed above in the context of FIG. 2. In the SLA-based approach, a client may indicate a service level defined in terms for performance, durability and/or availability—e.g., "10000 writes/second with a maximum latency of 50 milliseconds, and a data loss rate of less than 0.00001%". The SLA may be indicated via a programmatic request to the acceleration service and/or the storage service being used, and the acceleration service may translate the SLA to the appropriate settings.

With respect to the set of data objects or items affected, and the time period(s) for which the settings are applied, a write-API-based specification of a control setting may support arbitrary granularities 422 (e.g., as small as the targeted object for one write, such as a single database record or row, or groups of writes as in the case of transaction-related settings) and the setting specified may typically be applicable over fairly short durations 432 (e.g., corresponding to the processing of one or a few APIs). Other explicit mechanisms, involving the use of a console or a GUI tool, may apply to larger groups of data 424, such as an entire table or an entire instance of a data store, and the settings applied may remain in effect for longer durations 434 (e.g., until the settings are explicitly overridden). SLAs may be translated into explicit control settings at the data store level 426, and may also typically remain in effect for longer time periods 436 (e.g., until the SLAs are changed) in the depicted embodiment. In at least some embodiments, control settings requests at one granularity may override control settings requests at other granularities—e.g., a setting passed as a parameter of a write API call may override a setting determined via a console interaction. Default settings chosen for an entire AIF or for one or more data stores may remain in effect unless overridden by one of the mechanisms shown in FIG. 4 in some embodiments. Using the spectrum of choices shown in FIG. 4, a rich set of controls regarding various aspects of write operations may be supported in various embodiments.

Transaction Grouping

As mentioned earlier, in at least some embodiments control settings or requests may be used to commit a group of writes (i.e., the data modifications/additions/deletions indicated in the group of write requests) as an atomic unit, even if the back-end data stores do not necessarily natively support multi-write transactions or transactions that involve modifications to multiple data stores. FIG. 5 illustrates example timelines of events associated with transaction grouping requests, according to at least some embodiments. Along timeline 502A, a transaction start API call 516A (which may represent one example of a control settings request) may be issued at time T1. In some cases, the indication that a transaction which may potentially comprise multiple writes is to be begun may be provided via a parameter of a write API call itself; in other cases, a special "start-transaction" API may be used, or the starting point of a given transaction may be implicitly defined. For example, in one embodiment, upon encountering a commit transaction request (which may also be indicated via an optional parameter of an API call) without a matching explicit start transaction request, an AIN acting as the write coordinator may identify writes which (a) remain uncommitted at the time of the commit request, and (b) can be committed by the current write coordinator, and attempt to commit all such writes within a single transaction. At times T2, T3 and T4 of timeline 502A, additional write API calls 518A-518C may be detected at the AIN, indicating respective data modifications directed for example to respective data items within data stores DS1, DS2 and DS2 respectively. At time T5, another write request (518K) directed to DS1 may be received, with a parameter indicating a "commit-transaction" control setting. In the depicted example, the write coordinator role may have remained assigned to the same AIN in the time period T1-T5 (which began with the start transaction request and ended with the commit transaction request). As a result, the write coordinator of the accelerator fleet may be able to successfully commit all the writes or modifications corresponding to API calls 518A 518B, 518C and 518K (which collectively target data stores DS1 and DS2) as part of a single atomic transaction, as indicated by event 520 of timeline 502A. The term "modification", as used herein in the context of write requests, may refer generally to the creation of new data, the deletion of existing data, or a change to existing data.

In contrast, if the role of write coordinator happens to be reassigned during the period between a start-transaction control settings request and the corresponding commit-transaction control settings request, the commit of all the writes which were intended to be part of the transaction may not be possible. An example of this scenario is depicted along timeline 502B of FIG. 5. At time T7, a transaction start API call 516B is issued. At times T8 and T9, respective writes or write API calls, 518M and 518N, are issued to data stores DS1 and DS2. At time T10, the role of write coordinator is reassigned (e.g., due to a failure associated with the current write coordinator), as indicated by event 555. A write API call 518T containing a commit transaction is received at time T11. However, because the role of write coordinator has been reassigned since the start of the transaction, the new write coordinator may not have access to the cached copies of some of the writes which were intended to be part of the commit. The acceleration service may therefore not be able to perform the requested commit, and in some embodiments a transaction failure notification may be transmitted to the client 525 (e.g., in an event corresponding to time T12 on timeline 502B in FIG. 5).

Resource Validation

Figure 6:
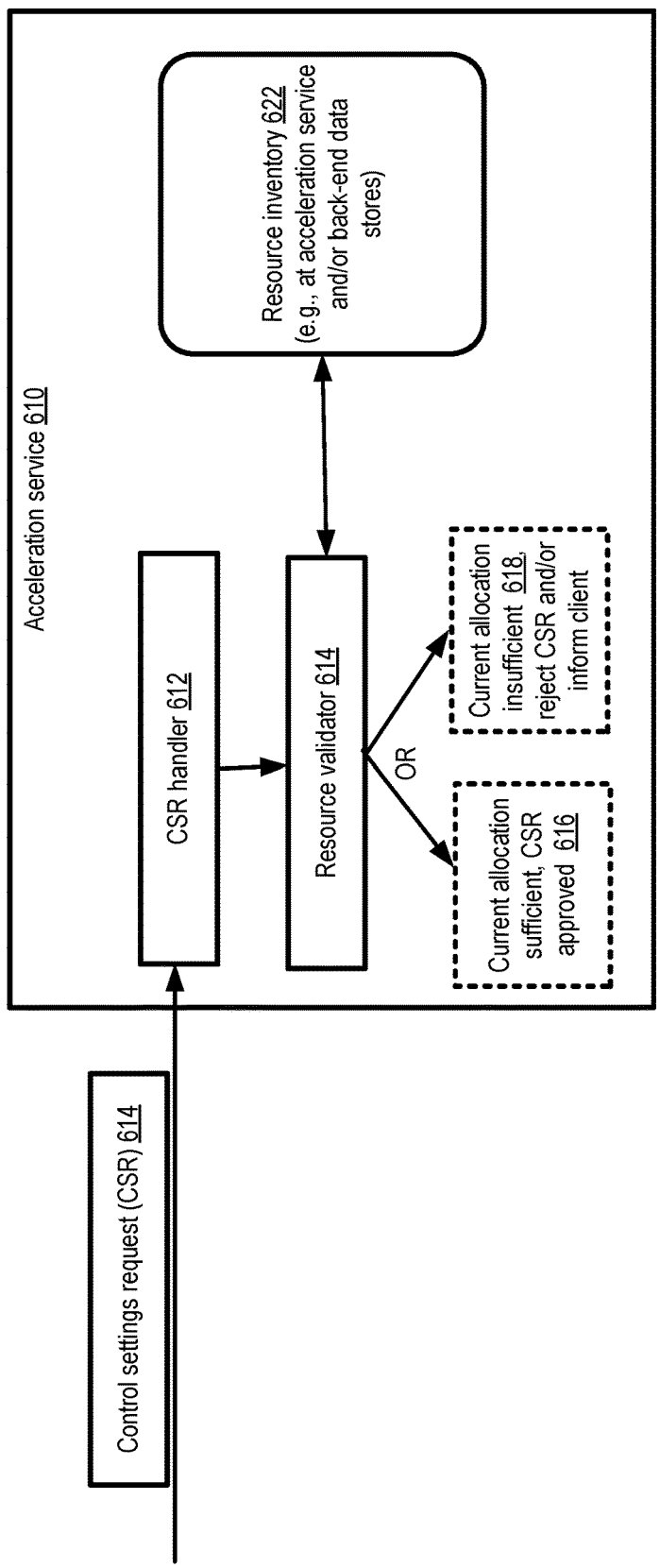
FIG. 6 illustrates a resource validator which may participate in the determination of responses to some types of control settings requests, according to at least some embodiments.

In some cases, it may sometimes not be feasible to implement a write control setting requested by a client using the current set of resources allocated to a client. FIG. 6 illustrates a resource validator which may participate in the determination of responses to some types of control settings requests, according to at least some embodiments. As shown, a control settings request (CSR) 614 may be received at a CSR handler (e.g., a subcomponent of a particular accelerator intermediary node) 612 in the depicted embodiment. The CSR handler may pass on the request to a resource validator 614. The resource validator 614 may be implemented at the same AIN or at a different component of acceleration service 610 as the CSR handler 612.

The resource validator 614 may examine the contents of the CSR as well as one or more resource inventories 622 to determine whether the set of resources available for the client are sufficient to meet the settings indicated in the CSR 614. If the resources are deemed sufficient, the CSR may be approved (as indicated in block 616) and further processing of the CSR may be initiated, e.g., to identify the write propagation node set and initiate operations at the members of the write propagation node set. If the resources are deemed insufficient, the CSR may be rejected (as indicated in block 618) and/or the client may be informed accordingly. In some cases, the client may be informed regarding a change to the allocated resources which would be required to implement or satisfy the CSR. In at least one embodiment, the required resources may be allocated (for example after an approval has been obtained from the client, although such approval may not be required based on the client's preferences), and the CSR may then be approved.

Caching at AINs

Figure 7:
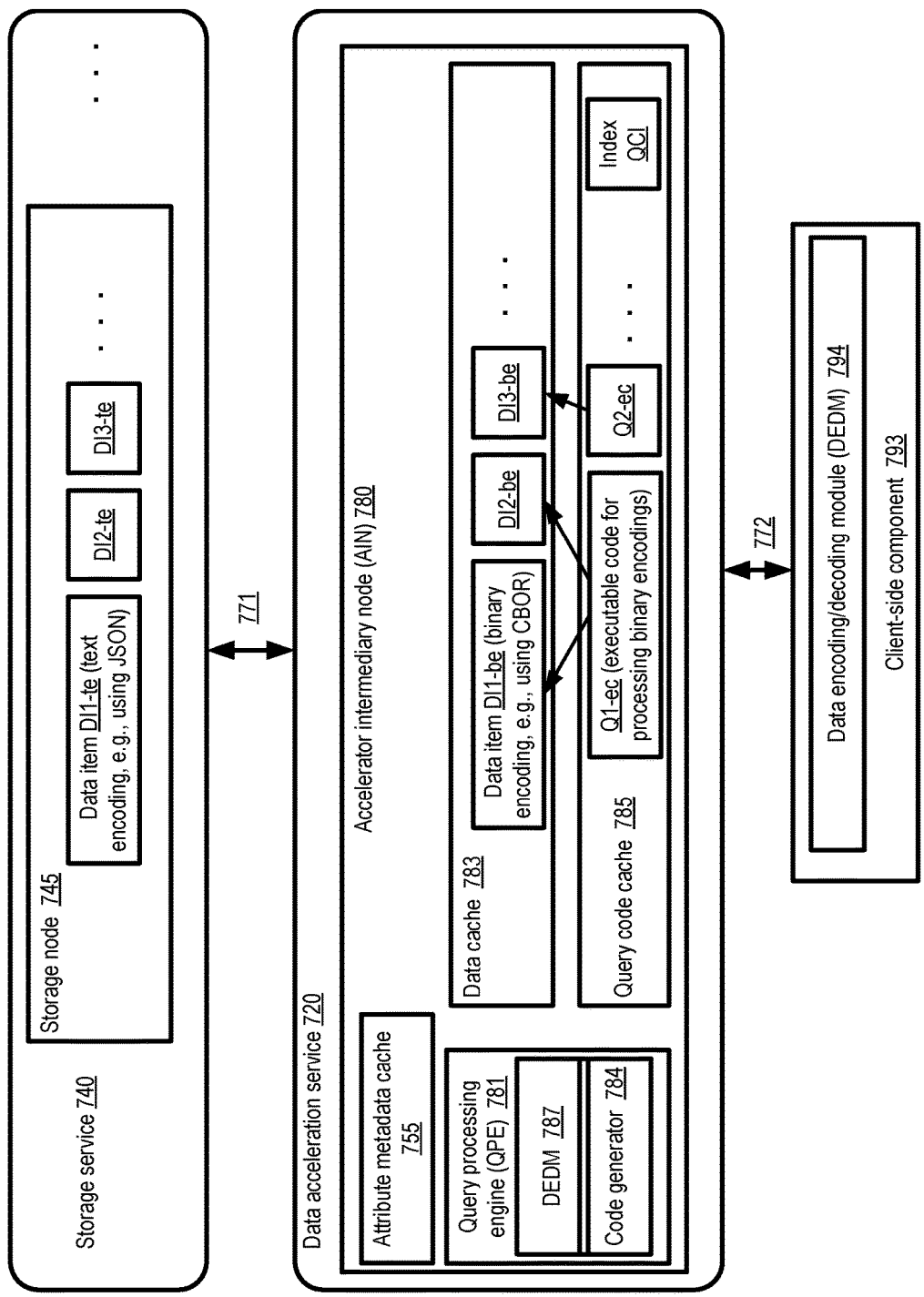
FIG. 7 illustrates an example accelerator intermediary node at which binary encodings of data items are stored in a local data cache, and executable code corresponding to client-submitted queries is stored in a local query code cache, according to at least some embodiments.

As mentioned earlier, one or more types of caches may be maintained for client data at an accelerator intermediary node. FIG. 7 illustrates an accelerator intermediary node at which binary encodings of data items are stored in a local data cache, and executable code corresponding to client-submitted queries is stored in a local query code cache, according to at least some embodiments. In the depicted embodiment, a storage node 745 of a multi-tenant storage service 740 comprises respective text encodings DI1-*te*, DI2-*te* and DI3-*te* of three data items. Client-side component 793 includes a data encoding/decoding module (DEDM) 794, which transforms read and write requests into a binary format supported at the data acceleration service 720. Accelerator intermediary node 780's query processing engine (QPE) 781 also comprises a data encoding/decoding module 787, in addition to a code generator 784 in the depicted embodiment. Write requests submitted from the client-side component 793 may include binary-encodings of the data items being written, prepared by the DEDM 794. In contrast, if the client-side component issues a write directly to the storage service, encoding of the write into binary format may not be required in the depicted embodiment. When a data item is retrieved from the storage service 740 in text format (as indicated by arrow 771), the DEDM 787 may transform it into a binary format before placing it in the data cache 783. In at least one embodiment, when the data items targeted by a write request component have to be transmitted to the storage node 745, their binary encodings may be transformed by DEDM 787 to corresponding text encodings prior to the transfer. Respective binary encodings DTI-*be*, DI2-*be* and DI3-*be* in cache 783 correspond to text encodings DI1-*te*, DI2-*te* and DI3-*te*.

Consider a scenario in which the data items DI1, DI2 and DI2 each comprise the same set of top-level attributes (i.e., attributes which are not children of any other attributes of the data items). When the first of the three data items is obtained at the AIN 780 (e.g., either from the client-side component as part of a write request 772, or from the storage service 740 in response to a read miss), a metadata entry may be generated to represent the top-level attributes of the data items. The metadata entry (which may be stored in a separate attribute metadata cache 755 and/or the data cache 783 itself) may include the names of the top-level attributes and the order in which the attribute contents are stored in the binary encodings. In some embodiments the attribute metadata entry may be replicated at one or more other AINs. When a read query Q1 directed to data items DI1, DI2 or DI3 is received from the client-side component at AIN 780, query code cache 785 may be searched to determine whether a code entry for the query is already present in the cache. If such an entry is not found, an executable code module Q1-*ec* may be produced by the code generator 784 and inserted into the cache. Q1-*ec* may include executable instructions to identify and manipulate the binary encodings of the targeted data items in the depicted embodiment. A query-code-related metadata entry may also be inserted into query code index QCI in some implementations, indicating that Q1-*ec* corresponds to a normalized version of query Q1 and indicating the metadata entry generated for the data items targeted by the query. The index entry, which identifies the combination of (a) the query whose code is cached and (b) the set of data items to which the query code applies (i.e., items with a common set of top-level attributes and a common ordering of top-level attributes), may be placed in a different cache in some embodiments. A query code index may be implemented using a variety of techniques in different embodiments, such as for example using a B-tree variant, a hash table, and so on. Subsequent queries which meet one or more matching criteria with respect to Q1 (e.g., criteria expressed in terms of the attributes for which query predicates are included in the queries, and the set of attributes of the data items targeted by the queries) may be satisfied by re-using Q1-*ec*. For example, in one embodiment executable code for a query QA may be re-used for a different query QB if (a) the normalized versions NQ-A and NQ-B of two queries QA and QB comprise the same query predicates, and if (b) QA and QB are both directed to data items with the same metadata entry indicating the data items' top-level attribute list. Similar modules Q2-*ec* etc. may be generated for other queries and stored in query code cache 785. If the workload comprises some fraction of repeated queries, storing the executable code for common queries may result in much faster query processing than if each repeated query had to be processed anew in the depicted embodiment. It is noted that in at least some embodiments, different encodings may be employed for data items at the data acceleration service and at the storage service layer, independently of whether control settings requests are supported or not. However, in embodiments in which control settings requests are supported, the amount of processing that is performed at various nodes of the acceleration service and/or the storage nodes for a given write request or set of write requests may be affected by the control settings. For example, an AIN may have to transform a binary encoding into a text encoding if a storage node is part of a write propagation node set for a given write request. In one embodiment, a control settings request may be used to indicate the type of encoding to be used at an AIN—e.g., a client may indicate that a text encoding is to be used, or a binary encoding is to be used, for one or more data objects targeted by write requests.

Non-Uniform Accelerator Nodes

Figure 8:
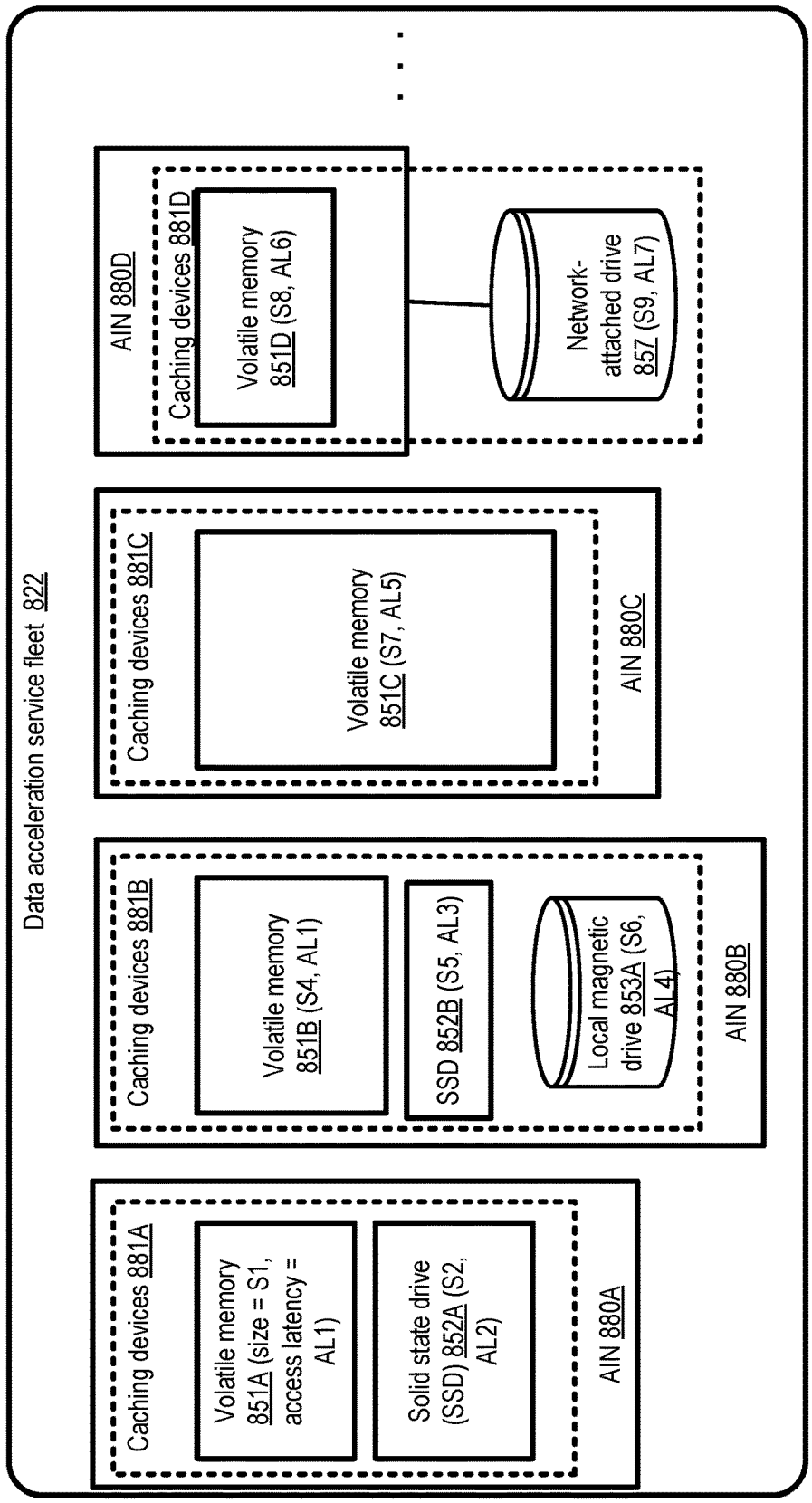
FIG. 8 illustrates examples of differences in capabilities and device types among accelerator intermediary nodes, according to at least some embodiments.

As mentioned earlier, the accelerator intermediary nodes (AINs) of a given fleet may differ from one another in various aspects. FIG. 8 illustrates examples of differences in capabilities and device types among accelerator intermediary nodes of a given fleet, according to at least some embodiments. Data acceleration service fleet 822 comprises four AINs 880A-880D. The local cache of AIN 880A comprises two caching devices 881A: a volatile memory 851A and a solid state drive (SSD) 852A. The volatile memory 851A of the cache of AIN 880A has a size S1 and an average access latency AL1 (e.g., a read response time for a data item of a selected size), while the SSD 852A has a size S2 and an average access latency AL2.

AIN 880B's caching devices 881B comprise three types of devices: a volatile memory 851B with size S4 and average latency AL1, an SSD 852B with size S5 and average latency AL3, and a local magnetic drive 853A with a size S6 and an average latency AL4. AIN 880C's caching devices 881C comprise only a volatile memory 851C with size S7 and access latency AL5. AIN 880D's caching devices 881D include a volatile memory 851D with size S8 and access latency AL6, and a network-attached drive 857 with a size S9 and an access latency AL7. In the non-uniform configuration illustrated in FIG. 8, the different AINs may use different combinations of a variety of storage or memory devices for their caches. In other embodiments, some subset (or all) of the AINs may have identical cache configurations. The particular storage devices available at an AIN may be used to select the AIN as a member of a write propagation node set in at least some embodiments—e.g., if the corresponding device type is indicated in a service quality request.

Fleet Configuration-Related Interactions

Figure 9:
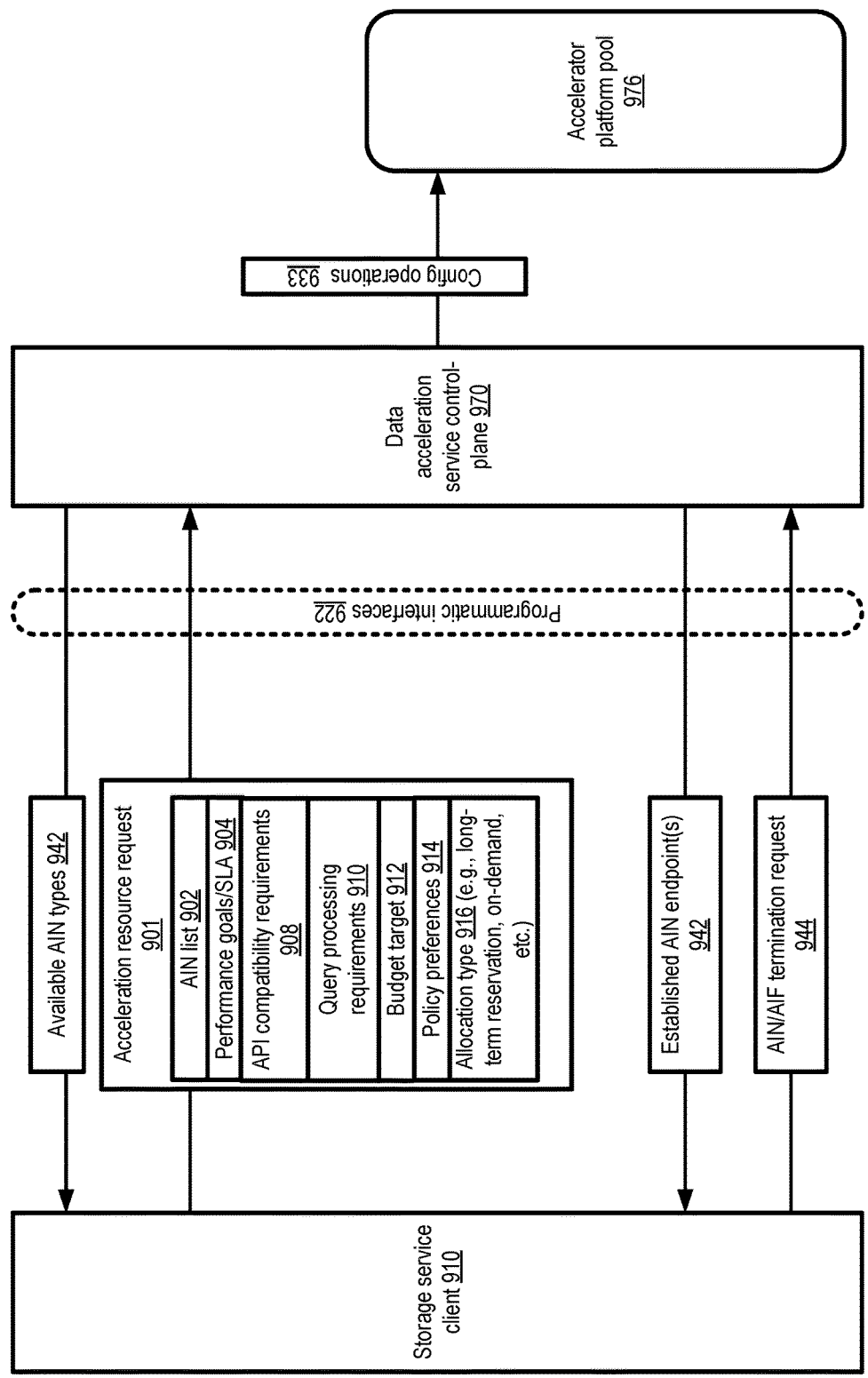
FIG. 9 illustrates example interactions between a client and the control-plane of a data acceleration service, according to at least some embodiments.

FIG. 9 illustrates example interactions between a client and the control-plane of a data acceleration service, according to at least some embodiments. A control-plane component 970 of the data acceleration service may implement a set of programmatic interfaces 922 enabling storage service clients 910 to submit accelerator intermediary fleet (AIF) configuration requests (in addition to the kinds of write requests and control settings-specific requests discussed earlier) and receive AIF-related information in the depicted embodiment. In some embodiments, a number of different accelerator intermediary node (AIN) types, which may for example differ from one another in performance capabilities, cache size and/or query processing capabilities, may be supported at the data acceleration service. In one scenario, "large", "medium" and "small" AINs may be supported, for example. An indication 942 of available AIN types may be provided via programmatic interfaces 922 to a client 910 in the depicted embodiment.

The client 910 may indicate initial requirements or preferences for an AIF using a variety of different parameters of an acceleration resource request 901. In some cases, for example, a client may simply provide a list of desired AINs 902, such as the logical equivalent of "Please establish four medium AINs for my back-end data store DS1". In at least one embodiment, a client may instead or in addition provide a set of performance goals 904 (which may be expressed in the form of a service level agreement or SLA), such as a targeted latency and/or throughput for various types of I/O operations, and the control-plane component 970 may use the performance goals to determine how many AINs of each supported type should be established. In some implementations the SLA may include targets for desired durability, availability and/or other service quality characteristics as well as, or instead of, performance. As mentioned earlier in the context of FIG. 4, an SLA may be translated into lower-level control settings by the acceleration service in various embodiments. For example, specific settings for replication count, device types, etc., may be selected based on the SLA. If the client wants the data cached at the accelerator to be stored at persistent storage devices to achieve a desired level of availability or durability, AINs with attached SSDs or rotating disks may be allocated.

In some embodiments, as discussed earlier, a number of back-end data stores with distinct APIs or query languages may be used for the customer's data sets, and the customer may indicate the API compatibility requirements 908 for their AINs (e.g., the set of languages or interfaces which the AIN is to use on behalf of the client I/O requests) in acceleration resource request 901. In various embodiments, the query processing engines of some AINs may be able to recognize contained queries (e.g., queries whose results can be determined using data that has been cached earlier for other queries with different query parameters). If a client prefers to utilize AINs with such capabilities, corresponding query processing requirements 910 may be included in request 901 in the depicted embodiment. In some embodiments the query processing requirements 910 may indicate whether code should be generated and/or cached locally for at least some types of queries.

Different pricing rules or policies may apply to different types of accelerator intermediary nodes in some embodiments, while in other embodiments the pricing for an AIN may be based on the performance achieved or targeted rather than on AIN types. A budget target 912 for the AIF may be indicated by the client in the request 901 in some embodiments. Some clients may include caching policy preferences 914 in their request for acceleration resources—e.g., desired rules governing read/write distribution (whether writes should only be directed to a master node or not, whether reads can be satisfied from a non-master node, etc.), query code generation, cache eviction, read miss processing and the like may be indicated. In one embodiment, AINs may be allocated in several different modes to customers—e.g., some AINs may be reserved for long time periods, others may be obtained and released on demand, etc., with different pricing associated with the different modes. The allocation type(s) 916 that the client wishes to use for their AIF nodes may be indicated in the resource request 901 in the depicted embodiment. In various embodiments, at least a subset of the types of request parameters shown in FIG. 9 may be omitted (or other parameters may be included)—for example, the client may simply provide a list of desired AINs and leave other decisions to the service.

Upon receiving acceleration resource request 901, the control plane component 970 may identify a set of AIN platforms for the client from accelerator platform pool 976 in the depicted embodiment. In some cases different parameters specified by the client may contradict one another—for example a budget target may not be compatible with a performance goal or an availability goal. In such cases the control-plane component may prioritize the competing requirements, come up with a best-effort configuration which meets at least some of the requirements/preferences, and notify the client regarding the proposed solution. If the client approves the proposed configuration (or if the requirements do not contradict one another), the appropriate platforms may be selected for the client's AINs. Configuration operations 933 may be performed to establish the AINs, and a set of endpoints 942 (e.g., Internet Protocol addresses, uniform resource locators (URLs), aliases, etc.) corresponding to the established AINs may be provided to the client. At some later point in time, the client may programmatically terminate or shut down individual AINs or the entire AIF, e.g., using termination requests 944 in the depicted embodiment.

Write-Back Journals and Thread Pools

Figure 10:
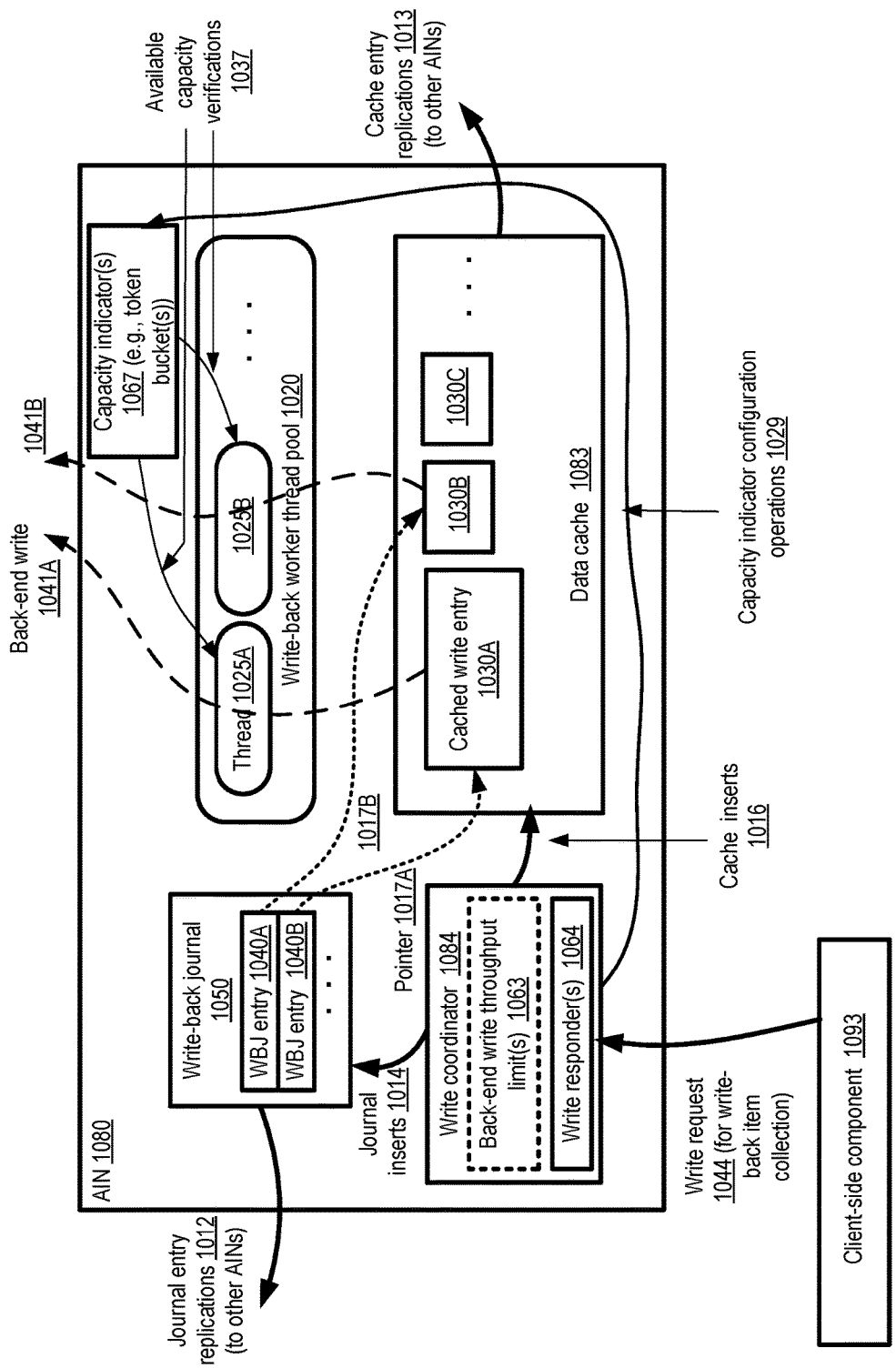
FIG. 10 illustrates example components of an accelerator intermediary node which may be used to support a write-back mode of handling cached writes, according to at least some embodiments.

As mentioned earlier, in at least some embodiments a write-back mode may be supported at the acceleration service, in which writes are cached at the AINs and submitted to the back-end data stores asynchronously. Control settings requests may be used to indicate whether some set of writes is to use write-back or write-through mode in various embodiments. FIG. 10 illustrates an example accelerator intermediary node at which a pool of write-back threads may be instantiated, according to at least some embodiments. The write coordinator 1084 at the AIN 1080 may determine, e.g., using a protocol which involves the exchange of some number of messages with a back-end data store, respective limit(s) 1063 for rates of back-end writes directed to various data item collections for which the AIN 1080 is configured. The write coordinator 1084 may establish a pool 1020 of write-back worker threads 1025 (e.g., 1025A and 1025B), with the size of the pool being determined based at least in part on the write throughput limit(s) 1063.

A client-side component 1093 may submit a write request 1044 in write-back mode (as indicated, for example, in a control setting included as a parameter in the write request or submitted separately) to accelerator intermediary node 1080. In response to the receipt of the write request, a new journal entry 1040 (e.g., 1040A or 1040B) may be inserted into a local write-back journal 1050 in the depicted embodiment, as indicated by arrow 1014, and a cached write entry 1030 (e.g., 1030A, 1030B or 1030C) representing the modifications requested by the client-side components may be inserted into local data cache 1083. In the depicted embodiment, the write coordinator may comprise one or more write responder subcomponents 1064 (e.g., respective threads of execution) which receive write requests, generate the journal and cache entries based on control settings, and provide responses to the client-side components. In some embodiments, the journal 1050 may comprise several partitions, with a target partition for a given entry being selected based on any of various factors such as the particular data item collection (e.g., table identifier) to which the write request is directed, the particular data item (e.g., table record) to which the write request is directed, the number of write-back threads instantiated, etc. Each write-back journal (WBJ) entry 1040 in the journal 1050 may include a respective pointer to the corresponding write cache entry, such as pointers 1017A and 1017B of journal entries 1040A and 1040B. In some embodiments, the write cache entries 1030 and/or the write-back-journal entries 1040 may be replicated at other AINs of the fleet (as indicated by arrows 1013 and 1012), e.g., depending on applicable control settings. In at least one embodiment, the successful replication of the journal entry and/or the cached write entry at some selected number of AINs may be required before a completion response corresponding to a write request is provided to the client-side component 1093 (e.g., based on data durability-related control settings). In some implementations, the number of required replicas of write-back journal entries or cache entries may be configurable at the AIF level and/or at the data item collection level, e.g., using control settings. Thus, for example, with respect to a particular table T1 being cached at an accelerator intermediary fleet AIF 1, at least two replicas of the entries may be required before a response indicating success is provided to a client-side component's write request, while for a different table T2 being cached at AIF1, at least three replicas may be required at respective AINs.

Each write-back thread 1025 may be responsible for examining the write-back journal 1050, identifying outstanding writes for which the thread 1025 is responsible, and issuing the corresponding back-end writes 1041 (e.g., 1041A or 1041B) to the data stores associated with the AIN 1080. After the back-end write completes successfully, the journal entry may be deleted in the depicted embodiment, e.g., by the write-back thread 1025 which verified the success of the back-end write. In some embodiments, each thread 1025 may be responsible for propagating the writes indicated in a respective partition of the journal 1050. The journal entries for a particular data item collection (such as a particular table) may be stored contiguously within journal 1050 in some embodiments, enabling a write-back thread 1025 to combine multiple back-end writes into a single message to the data store layer in some cases. It is noted that in one embodiment in which the cached data at the AINs is stored in binary encoding format (as discussed earlier), the write-back threads may be responsible for transforming the cached writes into the encoding used at the data store layer (if it differs from the encoding used at the accelerator intermediary layer).

In at least one embodiment, an additional mechanism for dynamically rate-limiting the back-end writes 1041 may be implemented. Respective dynamic capacity indicators 1067 such as token buckets may be initialized, e.g., by the write coordinator (as indicated by arrow 1029) based on the write throughput limits 1063 for one or more data item collections. Before submitting a given back-end write, a write-back thread 1025 may verify that the back-end has sufficient capacity available using the indicators, as indicated by arrows 1037. For each submitted back-end write, the remaining available capacity at indicators 1067 may be reduced. The available capacity may be increased based on a refill rate setting corresponding to the most recent write throughput limit—e.g., if the write throughput limit is 100 writes per second for a particular table, a corresponding token bucket may be refilled at the rate of 10 tokens every 100 milliseconds (up to a maximum bucket population of 100). In some embodiments, write capacity indicators may not be used.

Several of the properties of the environment illustrated in FIG. 10 may be modified dynamically. For example, the throughput limits 1063 may be refreshed periodically or in response to certain triggering events, the number of back-end threads in pool 1020 may be increased or decreased in response to changes in the throughput limits or in the number of data item collections being cached at AIN 1080, the parameters of the dynamic capacity indicators 1067 may be modified over time, and so on. Some of these types of changes may be implemented in response to control settings requests in at least one embodiment.

Methods for Supporting Write Control Settings

Figure 11:
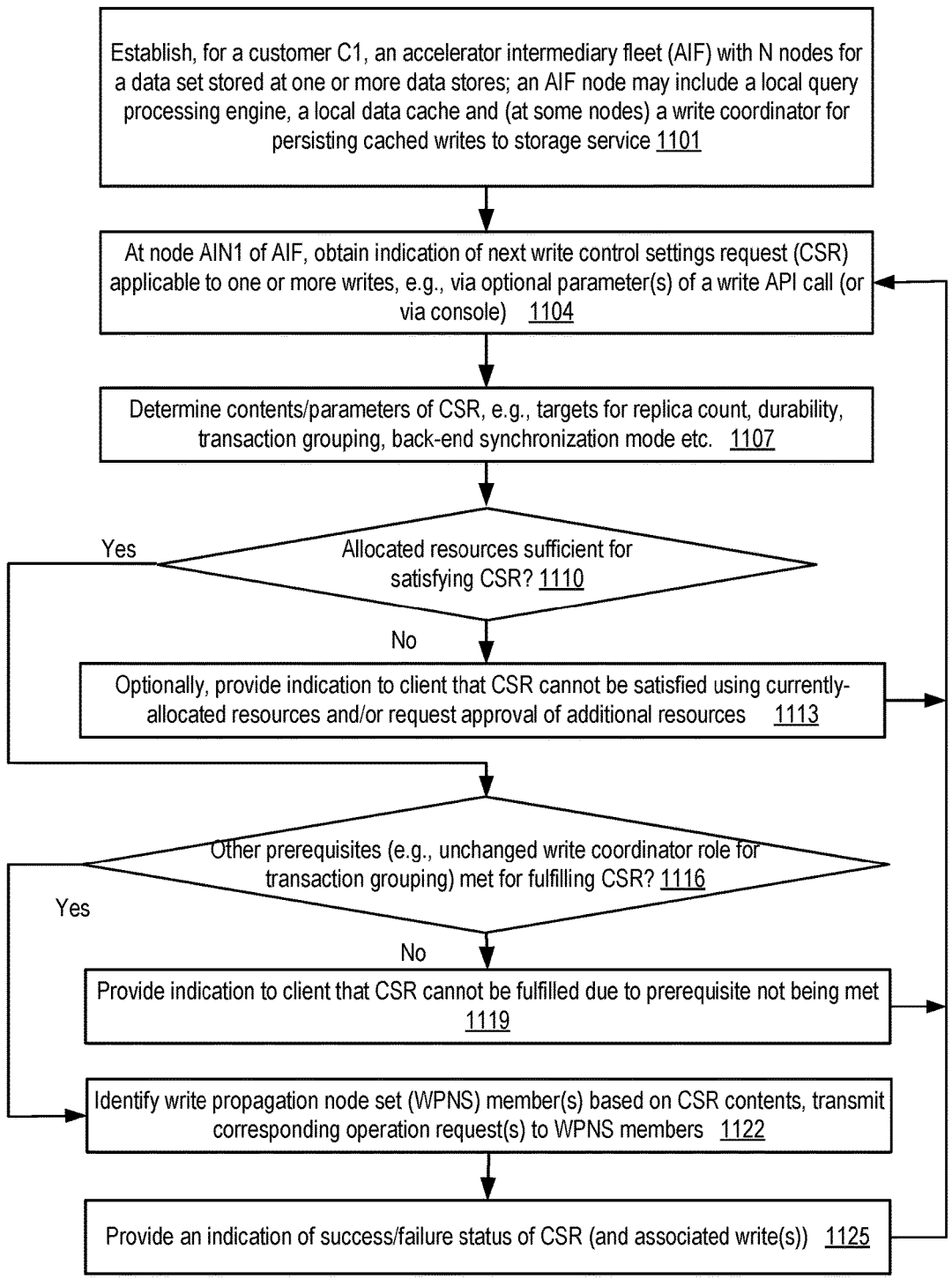
FIG. 11 is a flow diagram illustrating aspects of operations that may be performed at a data acceleration service to support variable-granularity control settings requests, according to at least some embodiments.

FIG. 11 is a flow diagram illustrating aspects of operations that may be performed at a data acceleration service to support variable-granularity control settings requests, according to at least some embodiments. As shown in element 1101, a fleet of accelerator intermediary nodes may be established for a data set stored at one or more back-end data stores of one or more storage service(s) on behalf of a customer C1. The fleet may be established, for example in response to an acceleration resource request similar to that shown in FIG. 9, or a default fleet may be set up when a client first establishes a data set at a data store, without the need for an explicit resource request. Individual accelerator intermediary fleet nodes may comprise a local data cache, a query processing engine and (at least at some nodes) a write coordinator responsible for propagating or persisting cached writes to the storage service.

At a given node AIN1 of the fleet, respective indications of one or more write control settings requests (CSRs), with each CSR being applicable to one or more writes, may be received over time via any of the various mechanisms discussed earlier. For example, an indication of the next CSR may be received as an optional parameter or parameters of a write API call (element 1104). In other cases, a CSR may be indicated via a command issued at a console (e.g., a web-based console or a console implemented as part of some other GUI), or generated at the AIN based on analysis of a high-level SLA.

The CSR may indicate or specify targets for various properties of the one or more writes, such as the number of replicas of the write payload that are to be saved, the data durability level associated with various replicas, whether some number of writes including the current write are to be committed as a single transaction, whether write-through mode or write-back mode is to be used to synchronize the back-end with the cached data at the accelerator layer, what the acceptable storage device types for the writes are, etc. The contents/parameters of the CSR may be parsed to determine each of the targets specified, and the scope of applicability of the targets (i.e., the set of writes which are to be affected by the CSR) (element 1107).

Generally speaking, two types of checking or validating operations may be performed in various embodiments before the operations needed to satisfy the CSR for a particular write are initiated: allocated resource checking, and logical prerequisites checking. In the depicted embodiment, the AIN may first attempt to verify whether sufficient resources are allocated to the requesting client, e.g., at the accelerator layer and/or the data store, to fulfill or satisfy the CSR. For example, if a replication count of three at the acceleration layer is requested, and there are only two nodes in the AIF, the requested replication level may not be feasible. Or, if the client wishes to ensure that the write is persisted to at least two disk-based storage devices at the acceleration service before the write completion response is provided, and less than two disk-equipped AINs have been set up for the client, the request may also not be feasible. If a determination is made that the allocated resources are insufficient (in operations corresponding to element 1110), the acceleration service may, for example, reject the CSR (or the corresponding write request if the CSR was indicated as a parameter of a write request) and indicate that sufficient resources were not available (e.g., provide indication to client that the CSR cannot be satisfied using currently allocated resources) (element 1113). In some embodiments, the AIN may attempt to acquire the necessary resources, and proceed with the CSR processing if the resources are acquired successfully within a target time interval. Approval of resource acquisitions may be requested from the clients in at least some embodiments (e.g., if the client's billed charges may increase as a result of the acquisition of additional resources).

If the allocated resources are adequate (as detected in operations corresponding to element 1110), the AIN may determine whether any other logical prerequisite conditions have to be met for the setting indicated in the CSR to be applied. For example, with respect to transaction grouping, if the role of write coordinator has been reassigned since the first write of the requested transaction was issued, the transaction as requested may not be committable. Other control setting characteristics may have their own logical requirements—e.g., for a write-through request, a targeted data store or table may be required to support immediate or synchronous acknowledgements of completed writes; thus, if immediate acknowledgements are not supported, it may not be possible to implement write-through for the write operations for which it is requested. If such a logical prerequisite is not met, as detected in operations corresponding to element 1116, the CSR (or the write request to which it corresponds) may be rejected, and an indication of the reason for the rejection may be provided to the client (element 1119). It is noted that for at least some types of CSRs, only one type of checking or validation may be required—e.g., logical prerequisites may not be relevant for some straightforward replication-related CSRs. In some implementations, neither type of checking or validation may be performed for at least some CSRs.

If the checking regarding resources and/or logical prerequisites is successful, write propagation node set (WPNS) member(s) to which at least some of the contents of one or more writes are to be transmitted may be identified (element 1122), and corresponding operation requests may be sent to the members of the WPNS. The WPNS may comprise, for example, zero or more other AINs (e.g., if write contents are to be replicated at multiple AINs), and zero or more back-end storage nodes. At least some of the operations at the WPNS need not be performed synchronously with respect to the write completion responses in various embodiments. For example, a CSR may indicate that (a) two copies of the write payload are to be created at the accelerator layer using disk-based caches, with acknowledgements of the replications required before write completion is indicated and (b) that write-back mode is to be used with respect to a back-end data store. In response, if the AIN handling the CSR uses a disk-based storage device for its data cache, the WPNS may comprise one other AIN equipped with a disk-based data cache, and a storage node at the back end. The operation requested from the other AIN may comprise an immediately-acknowledged replication of the write, and the operation requested from the storage node may comprise an asynchronous write (e.g., without an acknowledgement). For committing a group of writes to the back-end as a unit (including the current write), the WPNS may comprise all the back-end storage nodes (some of which may be part of different data stores than others) to which the writes of the group are directed, and the operations requested may comprise acknowledged writes. Similar decisions regarding the specific sets of other nodes (if any) at which operations need to be performed may be made for various writes, depending on the applicable control settings. Using the variable-granularity write service controls discussed herein, customers may be able to fine tune the performance of their applications, and different levels of durability and availability of different subsets of data may be achieved. After the operations to some or all members of the WPNS are initiated, an indication of the success or failure of the CSR and/or the associated write(s) may be provided to the client (element 1125). Operations similar to those performed in elements 1104 onwards may be repeated for subsequently-received CSRs.

It is noted that in various embodiments, at least some operations other than those illustrated in the flow diagram of FIG. 11 may be used to implement the write control setting related techniques described above. Some of the operations shown may not be implemented in some embodiments or may be implemented in a different order, or in parallel rather than sequentially. For example, the logical prerequisites may be checked prior to the allocated resources in some embodiments.

Use Cases

The techniques described above, of customizing various characteristics of write operations using an accelerator intermediary fleet for one or more back-end storage services of a provider network may be useful in a number of scenarios. As customers of data storage services develop more and more sophisticated applications, the ability to control the manner in which different subsets of the data are replicated or made persistent may enable a tighter alignment of resources to specific application requirements than may have been possible using more coarse-granularity controls. For example, in one scenario, a time series of data points may be collected and written in one part of an application, and an analysis of the time series may be performed in another part of the application. In such a scenario, it may be acceptable to lose a few of the data points of the time series, as long as enough points remain for the analysis to be useful, and different control settings may therefore be used for the writes pertaining to the data points than are used for storing the results of the analysis. Supporting multi-write transactions, potentially across multiple data stores with different data models, may in some cases enable more complex business logic to be realized within applications than could be supported using the data stores themselves.

Illustrative Computer System

Figure 12:
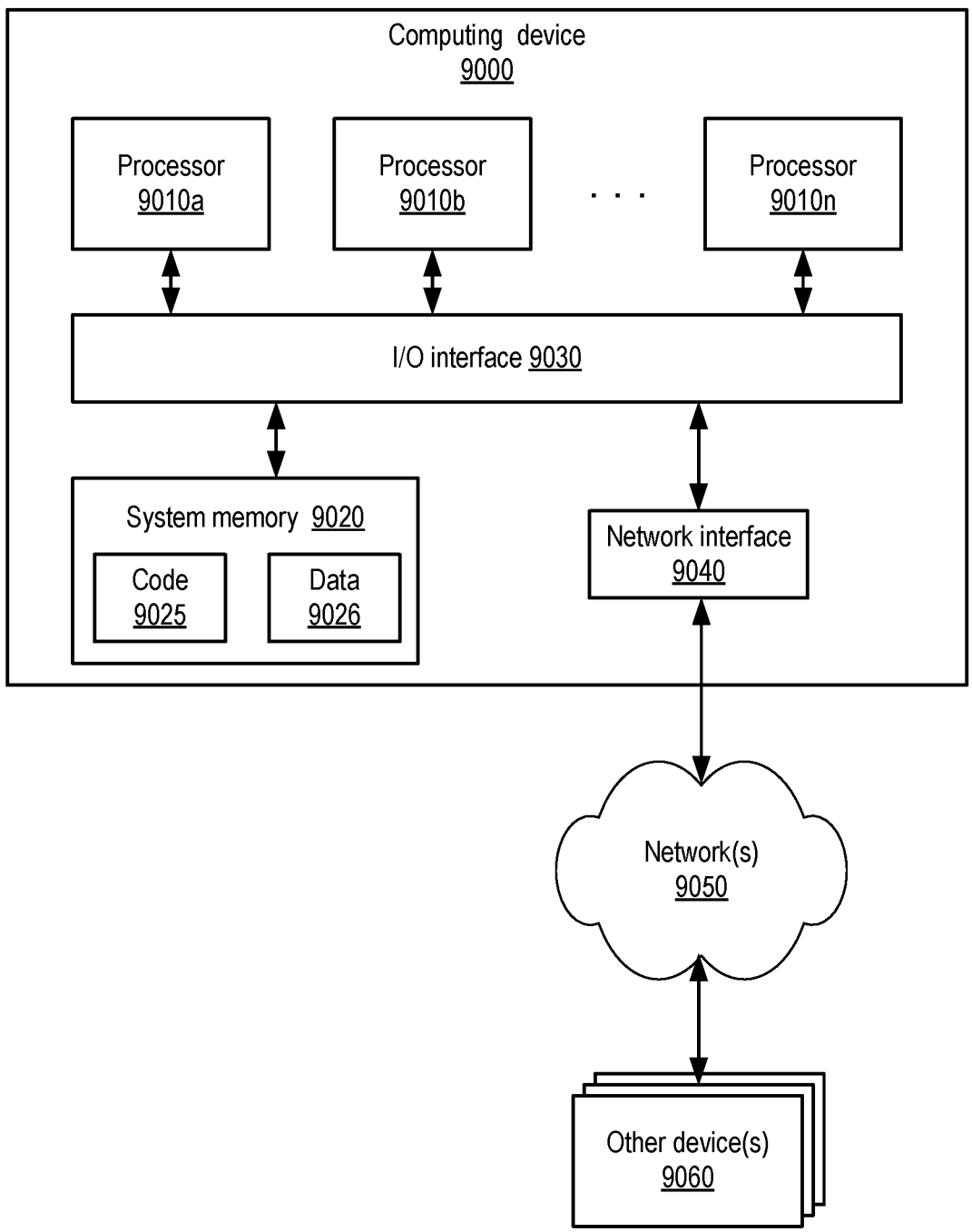
FIG. 12 is a block diagram illustrating an example computing device that may be used in at least some embodiments.

In at least some embodiments, a server that implements a portion or all of one or more of the technologies described herein, including the techniques to implement accelerator intermediary nodes, storage service nodes, client-side components, and the like may include a general-purpose computer system that includes or is configured to access one or more computer-accessible media. FIG. 12 illustrates such a general-purpose computing device 9000. In the illustrated embodiment, computing device 9000 includes one or more processors 9010a-9010n coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, scalable processor architecture (SPARC), or microprocessor without interlocked pipeline stages (MIPS) ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic random access memory (RAM) or any other type of memory. For the non-volatile portion of system memory (which may comprise one or more non-volatile dual in-line memory modules (NVDIMMs), for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks (SANs) such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or digital versatile disc/compact disc (DVD/CD) coupled to computing device 9000 via I/O interface 9030. A non-transitory computer-accessible storage medium may also include any volatile or non-volatile media such as RAM (e.g. synchronous dynamic RAM (SDRAM), double data rate (DDR) SDRAM, RAMBUS DRAM (RDRAM), static RAM (SRAM), etc.), read only memory (ROM), etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as a network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more accelerator intermediary nodes associated with a plurality of data stores of a provider network, including a first accelerator intermediary node implemented at least in part at a first computing device, wherein the plurality of data stores include a first data store with a first data model and a second data store with a different data model;
wherein the first accelerator intermediary node is configured to:
obtain, via a first programmatic interface, an indication of a first control setting to be applied with respect to a first write request directed to a first data item, wherein the first control setting specifies a respective first target for one or more of: (a) replication count, (b) data durability, (c) transaction grouping with respect to one or more write requests including the first write request, or (d) a back-end synchronization mode;
determine, based at least in part on the first control setting, a first write propagation node set with respect to the first write request, wherein the first write propagation node set comprises one or more of (a) a second accelerator intermediary node of the one or more accelerator intermediary nodes or (b) a first storage node of the first data store;
transmit, prior to providing an indication that the first write request has succeeded, a respective first operation request corresponding to the first write request to one or more members of the first write propagation node set;
receive an indication of a second control setting to be applied with respect to a second write request directed to a second data item, wherein at least one target indicated in the second control setting differs from a corresponding target indicated in the first control setting; and
transmit a respective second operation request corresponding to the second write request to one or more members of a second write propagation node set, wherein the second write propagation node set comprises a second storage node of the second data store.

2. The system as recited in claim 1, wherein the first control setting indicates that a plurality of write requests, including the first write request, are to be committed together as part of a multi-write transaction, wherein the plurality of write requests includes a third write request directed to a third data item of the second data store.

3. The system as recited in claim 2, wherein the first accelerator intermediary node is further configured to:
determine an assignee of a write coordinator role with respect to a different write request of the plurality of write requests; and
verify, prior to attempting a commit of the multi-write transaction, that the write coordinator role has not been reassigned after the different write request was processed.

4. The system as recited in claim 1, wherein the first accelerator intermediary node is further configured to:
obtain an indication of a third control setting to be applied with respect to a third write request directed to a third data item; and
in response to determining that applying the third control setting would require a change to a set of resources allocated on behalf of one or more clients, reject the third control setting.

5. The system as recited in claim 1, wherein the first accelerator intermediary node is further configured to:
insert, prior to transmitting a first operation request, a data entry into a local data cache of the first accelerator intermediary node, wherein the data entry indicates a modification operation included in the first write request, wherein the data entry is formatted in accordance with a binary encoding; and
wherein the first storage node is configured to store a representation of the first data item formatted in accordance with a different encoding at a persistent storage device of the first storage node, in response to the first operation request.

6. A method, comprising:
performing, at a first accelerator intermediary node of a fleet of accelerator intermediary nodes associated with one or more data stores, wherein the first accelerator intermediary node comprises one or more computing devices:
obtaining, via a first programmatic interface, an indication of a first control setting to be applied with respect to a first write request directed to a first data item, wherein the first control setting specifies a respective first target for one or more of: (a) data durability or (b) transaction grouping with respect to one or more write requests including the first write request;
identifying, based at least in part on the first control setting, a first write propagation node set with respect to the first write request, wherein the first write propagation node set comprises one or more of (a) a second accelerator intermediary node of the fleet of accelerator intermediary nodes or (b) a first storage node of a first data store of the one or more data stores; and
transmitting a respective first operation request corresponding to the first write request to one or more members of the first write propagation node set.

7. The method as recited in claim 6, wherein the first control setting indicates that a plurality of write requests, including the first write request, are to be committed as one multi-write transaction to the one or more data stores.

8. The method as recited in claim 7, further comprising performing, by the first accelerator intermediary node:
determining an assignee of a write coordinator role with respect to a different write request of the plurality of write requests; and
verifying, prior to attempting a commit of the multi-write transaction, that the write coordinator role has not been reassigned after the different write request was processed.

9. The method as recited in claim 6, further comprising performing, by the first accelerator intermediary node:

obtaining an indication of a second control setting to be applied with respect to a second write request directed to a second data item; and determining that applying the second control setting would require a change to a set of resources allocated on behalf of a client.

10. The method as recited in claim 9, further comprising performing, by the first accelerator intermediary node:

in response to determining that applying the second control setting would require a change to a set of resources, providing an indication that the second control setting has been rejected.

11. The method as recited in claim 9, further comprising performing, by the first accelerator intermediary node:

in response to determining that applying the second control setting would require a change to a set of resources, providing an indication of the change to a client.

12. The method as recited in claim 6, wherein the first control setting indicates an acceptable storage device type at which a portion of at least one replica of the first data item is to be stored.

13. The method as recited in claim 6, wherein obtaining the indication of the first control setting comprises:

determining a value of a parameter passed in an invocation of an API (application programming interface) by a client-side component of a network-accessible storage service.

14. The method as recited in claim 13, wherein one or more other parameters are passed in the invocation, including one or more of: (a) an identifier of the first data item or (b) a write payload.

15. The method as recited in claim 6, further comprising:

inserting, by the first accelerator intermediary node prior to transmitting a first operation request, a data entry into a local data cache of the first accelerator intermediary node, wherein the data entry indicates a modification operation included in the first write request, wherein the data entry is formatted in accordance with a binary encoding; and in response to the first operation request, storing, at a persistent storage device of the first storage node, a representation of the first data item formatted in accordance with a different encoding.

16. A non-transitory computer-accessible storage medium storing program instructions that when executed on one or more processors implement an accelerator intermediary node of a fleet of accelerator intermediary nodes associated with one or more data stores, wherein the accelerator intermediary node is configured to:

obtain, via a first programmatic interface, an indication of a first control setting to be applied with respect to a first write request directed to a data item, wherein the first control setting specifies a transaction grouping with respect to one or more write requests including the first write request;

identify, based at least in part on the first control setting, a first write propagation node set with respect to the first write request, wherein the first write propagation node set comprises one or more of (a) a second accelerator intermediary node of the fleet of accelerator intermediary nodes or (b) a first storage node of a first data store of the one or more data stores; and transmit a respective first operation request corresponding to the first write request to one or more members of the first write propagation node set.

17. The non-transitory computer-accessible storage medium as recited in claim 16, wherein the first control setting includes an indication of: (a) a replication count with respect to the first write request and (b) a first acknowledgement requirement corresponding to at least a first replica indicated via the replication count.

18. The non-transitory computer-accessible storage medium as recited in claim 17, wherein the first control setting includes an indication of: a different acknowledgement requirement corresponding to a second replica indicated via the replication count.

19. The non-transitory computer-accessible storage medium as recited in claim 16, wherein the first programmatic interface comprises a console for the fleet of accelerator intermediary nodes.

20. The non-transitory computer-accessible storage medium as recited in claim 16, wherein to obtain the indication, the accelerator intermediary node is configured to examine contents of a first message received via a network, wherein the accelerator intermediary node is configured to:

examine contents of a second message received via the network to obtain the first write request.

* * * * *